(12) United States Patent
Meinherz et al.

(10) Patent No.: US 9,823,352 B2
(45) Date of Patent: Nov. 21, 2017

(54) ABSOLUTE DISTANCE MEASUREMENT FOR TIME-OF-FLIGHT SENSORS

(71) Applicant: CEDES Safety & Automation AG, Landquart (CH)

(72) Inventors: Carl Meinherz, Malans (CH); Martin Hardegger, Sargans (CH); Manfred Stein, Domat/Ems (CH); Danilo Dorizzi, Klosters (CH)

(73) Assignee: Rockwell Automation Safety AG, Landquart (CH)

( * ) Notice: Subject to any disclaimer, the term of this patent is extended or adjusted under 35 U.S.C. 154(b) by 465 days.

(21) Appl. No.: 14/530,628

(22) Filed: Oct. 31, 2014

(65) Prior Publication Data

US 2016/0124089 A1    May 5, 2016

(51) Int. Cl.
| | | |
|---|---|---|
| *G01S 17/08* | (2006.01) | |
| *G01C 3/32* | (2006.01) | |
| *G01S 17/02* | (2006.01) | |
| *G01S 17/10* | (2006.01) | |
| *G01S 17/36* | (2006.01) | |
| *G01S 17/48* | (2006.01) | |
| *G01S 17/87* | (2006.01) | |

(Continued)

(52) U.S. Cl.
CPC ............... *G01S 17/08* (2013.01); *G01C 3/32* (2013.01); *G01S 7/497* (2013.01); *G01S 17/023* (2013.01); *G01S 17/10* (2013.01); *G01S 17/36* (2013.01); *G01S 17/48* (2013.01); *G01S 17/87* (2013.01); *G01S 17/89* (2013.01)

(58) Field of Classification Search
CPC ............ G01S 7/28; G01S 13/765; G01C 3/08
See application file for complete search history.

(56) References Cited

U.S. PATENT DOCUMENTS

| 5,625,080 A | 4/1997 | Heizmann et al. |
| 5,874,719 A | 2/1999 | Hippenmeyer et al. |

(Continued)

FOREIGN PATENT DOCUMENTS

| CN | 102393515 | 3/2012 |
| DE | 102009057104 | 5/2014 |

OTHER PUBLICATIONS

Extended European Search Report for EP Application No. 15192092.3, dated Jul. 11, 2016, 11 pages.

(Continued)

*Primary Examiner* — Luke D Ratcliffe
(74) *Attorney, Agent, or Firm* — Amin, Turocy & Watson, LLP

(57) ABSTRACT

A time-of-flight (TOF) sensor device is provided with features for correcting distance measurement offset errors caused by such factors as temperature, dynamic reflectivity ranges of objects in the viewing space, or other factors. In various embodiments, the TOF sensor device generates corrected distance values based on comparison of two different distance values measured for an object by two different measurement techniques, including but not limited to phase shift measurement, pulsed TOF measurement, distance measurement based on the focal length of the TOF sensor's lens, and comparison of distance variations with light intensity variations. In addition, some embodiments of the TOF sensor device perform self-calibration using internal waveguides or parasitic reflections as distance references.

20 Claims, 26 Drawing Sheets

ILLUMINATION

(51) Int. Cl.
 *G01S 17/89* (2006.01)
 *G01S 7/497* (2006.01)

(56) References Cited

U.S. PATENT DOCUMENTS

| | | | |
|---|---|---|---|
| 6,088,085 | A | 7/2000 | Wetteborn |
| 7,738,083 | B2 * | 6/2010 | Luo .................. G01S 17/325 |
| | | | 356/5.1 |
| 7,995,192 | B2 | 8/2011 | Wüstefeld |
| 8,334,969 | B2 | 12/2012 | Heizmann et al. |
| 8,384,883 | B2 | 3/2013 | Heizmann et al. |
| 8,933,593 | B2 | 1/2015 | Haberer et al. |
| 9,383,201 | B2 | 7/2016 | Jachman et al. |
| 2008/0231498 | A1 * | 9/2008 | Menzer .................. G01S 7/28 |
| | | | 342/134 |
| 2009/0195769 | A1 | 8/2009 | Luo et al. |
| 2011/0188028 | A1 * | 8/2011 | Hui .................. G01C 3/08 |
| | | | 356/5.01 |
| 2013/0050676 | A1 | 2/2013 | d'Aligny |
| 2013/0222550 | A1 | 8/2013 | Choi et al. |

OTHER PUBLICATIONS

European Office Action for EP Application No. 15192092.3, dated Aug. 16, 2016, 2 pages.
Extended European Search Report for European Application No. 15192092.3, dated Mar. 22, 2016, 7 pages.
Chinese Office Action for CN Application No. 201510717668.2 dated Aug. 15, 2017, 7 pages.

* cited by examiner

ABSOLUTE DISTANCE MEASUREMENT FOR TIME-OF-FLIGHT SENSORS

BACKGROUND

The subject matter disclosed herein relates generally to time-of-flight (TOF) sensors, more particularly, to techniques for correcting distance measurement offset in TOF sensors due to such factors as temperature, electronic characteristics, and mechanical set-up.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a time-of-flight (TOF) sensor device is provided comprising an illumination component configured to emit a light beam toward a viewing space; a first distance determination component configured to generate first distance information for a pixel corresponding to an object in the viewing space based on time-of-flight analysis of reflected light incident on a photo-receiver array; a second distance determination component configured to generate second distance information for the pixel corresponding to the object; and a distance adjustment component configured to apply a correction factor to the first distance information based on second distance information.

Also, one or more embodiments provide a method for generating distance information, emitting, by a time-of-flight (TOF) sensor comprising at least one processor, a light beam into a viewing area; generating, by the TOF sensor, a first distance value for a pixel corresponding to an object in the viewing area using a first distance measurement technique, wherein the first distance measurement technique comprises performing time-of-flight analysis of reflected light received at a photo-receiver array of the TOF sensor; generating, by the TOF sensor, a second distance value for the pixel corresponding to the object using a second distance measurement technique that is different than the first distance measurement technique; and applying a correction factor to the first distance value based on the second distance value.

Also, according to one or more embodiments, a non-transitory computer-readable medium is provided having stored thereon instructions that, in response to execution, cause a TOF sensor device to perform operations, the operations comprising, sending a light beam into an area being monitored by the TOF sensor device; determining a first distance value for a pixel corresponding to an object in the area using a first distance measurement technique, wherein the first distance measurement technique comprises performing time-of-flight analysis of reflected light received at a photo-receiver array of the TOF sensor device; determining a second distance value for the pixel corresponding to the object using a second distance measurement technique that is different than the first distance measurement technique; and modifying the first distance value based on the second distance value.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1B:
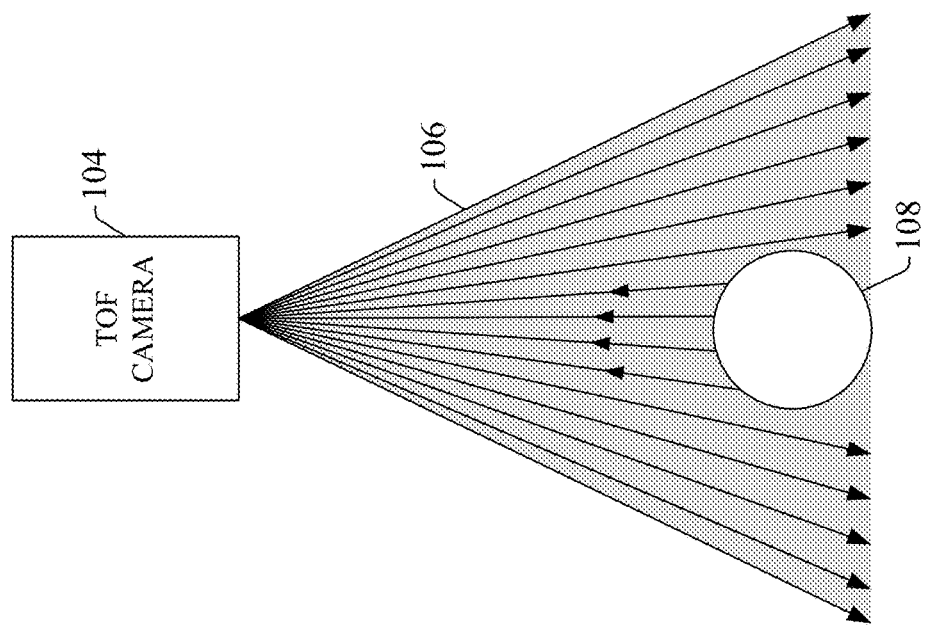
FIGS. 1A and 1B are schematics illustrating general operation of a time-of-flight (TOF) camera.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a microprocessor, a microcontroller, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Figure 1A:
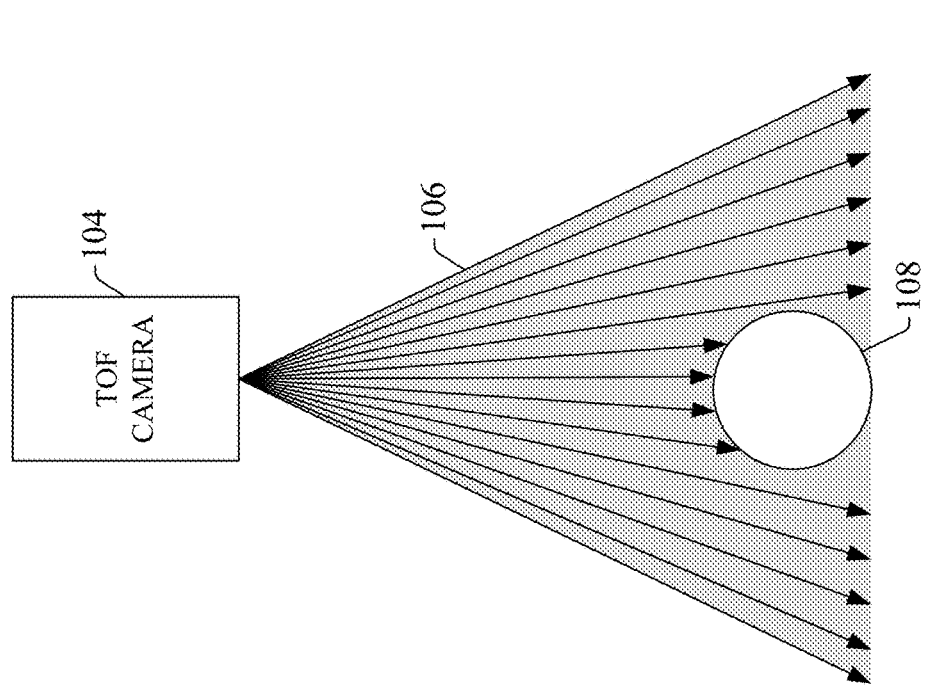

Time-of flight (TOF) cameras (also referred to as TOF sensors) use optical techniques to generate distance information for objects and surfaces within the camera's viewing field. FIGS. 1A and 1B illustrate an example TOF camera 104 measuring distance information for an object 108. TOF camera 104 illuminates a viewing field or scene by emitting a light beam 106, as shown in FIG. 1A. Objects and surfaces within the scene, including object 108, reflect light back to the receiving element of TOF camera 104, as shown in FIG. 1B. The TOF camera 104 then analyzes the reflected light to determine a distance measurement for each pixel of the resulting image. For TOF cameras that use a pulsed TOF approach, the camera measures the time difference between transmission of a light pulse and receipt of a reflected light pulse for each pixel of the scene. Since light speed is a constant in a given medium, the time delay between transmission of a light pulse and arrival of a corresponding reflected pulse for a given pixel is a function of the distance of a surface point corresponding to that pixel, the distance of an object at an area of the scene corresponding to the pixel can be determined. For TOF cameras that use a phase measurement approach, the camera determines the distance based on a phase difference between the emitted light beam 106 and the returned light beam. Collectively, the distance information obtained for all pixels of the scene yields depth map data for the scene.

There are a number of factors that can compromise measurement accuracy of TOF sensors. For example, many TOF sensors are sensitive to temperature, in that temperatures outside a rated tolerance can introduce distance measurement offset errors. High dynamic ranges of reflectivities within a viewing space being monitored can also impact distance measurement accuracy. In this regard, presence of both highly reflective objects and objects having low reflectivity within the viewing space can adversely affect distance values for some pixels, in part due to the difficulty in illuminating the scene at a level suited to both the light and dark objects. In some scenarios, adjusting the integration times for bright or dark objects can partially compensate for distance measurement inaccuracies. However, the resulting distance values may still include an offset error based on the reflectivity of the object.

To address these and other issues, various embodiments of the present disclosure provide TOF sensors that compensate for measurement offset errors to determine the absolute distance of objects within the viewing space. In some embodiments, the TOF sensor can supplement a primary TOF distance measurement with a second distance measurement generated using one of several disclosed techniques. According to one approach, the TOF sensor can control the focus of its receiving lens using integrated auto-focus functionality. The sensor can determine the focal length at which a given object within the viewing space is sharp, and the distance corresponding to this focal length can be used to calibrate the TOF sensor.

In another approach, a TOF sensor is equipped with two types of distance measurement components; e.g., a phase measurement component and a pulsed TOF measurement component. The sensor can leverage distance information from both distance measurement approaches to yield an absolute distance measurement.

In yet another approach, the TOF sensor can be configured to track variations in intensity of light reflected from objects within the viewing scene. Since this intensity is expected to vary as an inverse square of the distance, the sensor can cross-reference this intensity variation with the observed change in distance of the object, and determine an absolute distance by calibrating the sensor or by applying a correction to the distance value based on the intensity variation.

One or more embodiments of the TOF sensor described herein can also employ a second distance measurement principle to determine absolute distance information. For example, in addition to a TOF distance determination component (e.g., pulsed TOF or phase shift measurement), the sensor may also include an inductive sensor, a triangulation-based distance determination component, or another type of distance measurement component. This second distance determination component can be used to calibrate the TOF distance measurement component to ensure accurate distance values.

According to another approach, a TOF sensor can use internal referencing to periodically calibrate the sensor for accurate distance measurement. For example, the sensor may include an internal waveguide having a known distance and positioned to direct the light path from the emitter back to the sensor's photo-receiver. During a calibration sequence, the sensor's light emitter can switch from projecting light to the external viewing space to projecting the light to the waveguide, which guides the light over the known distance back to the sensor's photo-receiver. The sensor's distance determination components perform a distance calculation based on the light received from the waveguide, and the sensor compares this value with the known length of the waveguide. If the calculated distance does not match the known distance, the sensor calibrates the distance measurement components accordingly. In some embodiments, the sensor may use internal parasitic reflections rather than a waveguide to achieve the same result, as will be discussed in more detail herein.

Figure 2:
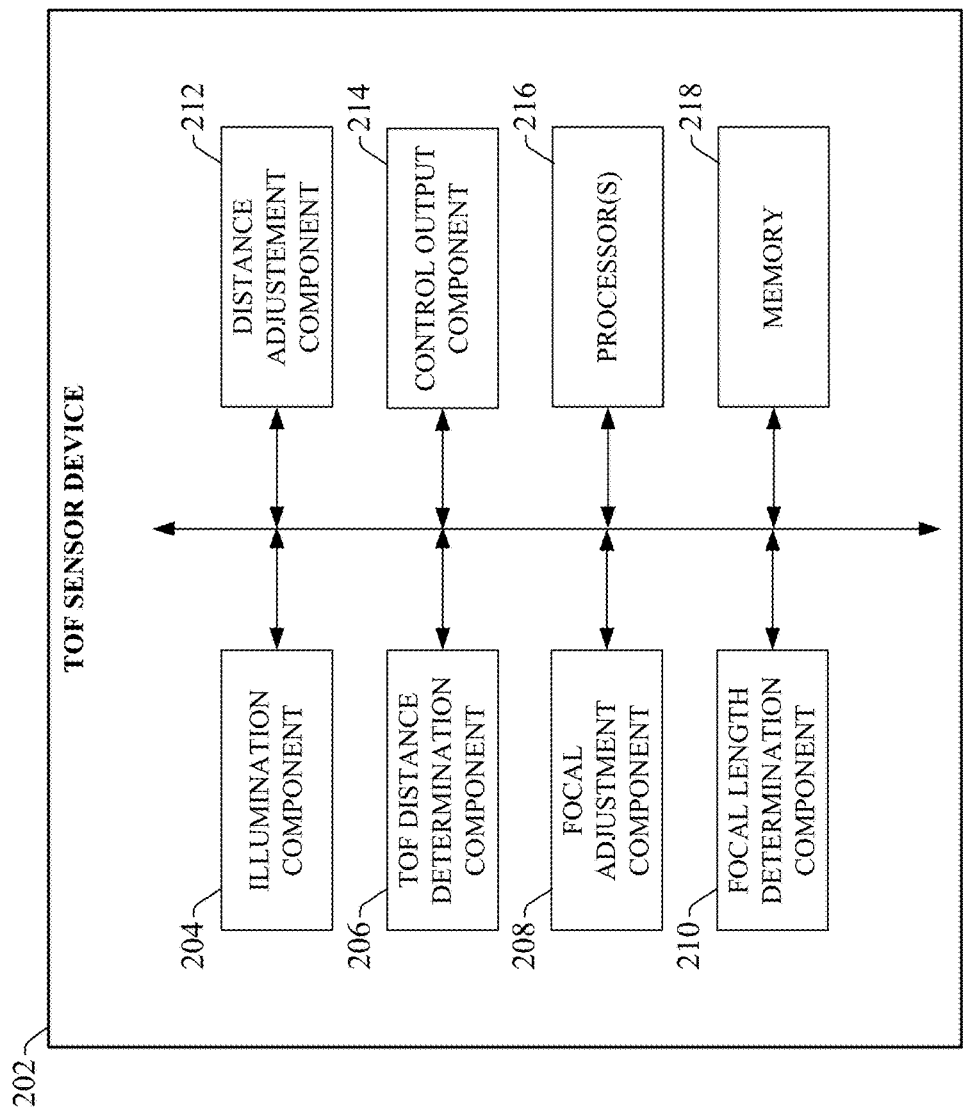
FIG. 2 is a block diagram of an example TOF sensor device that uses focal length to correct distance values.

FIG. 2 is a block diagram of an example TOF sensor device according to one or more embodiments of this disclosure. Although FIG. 2 depicts certain functional components as residing on TOF sensor device 202, it is to be appreciated that one or more of the functional components illustrated in FIG. 2 may reside on a separate device relative to TOF sensor device 202 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 202 can include an illumination component 204, a TOF distance determination component 206, a focal adjustment component 208, a focal length determination component 210, a distance adjustment component 212, a control output component 214, one or more processors 216, and memory 218. In various embodiments, one or more of the illumination component 204, TOF distance determination component 206, focal adjustment component 208, focal length determination component 210, distance adjustment component 212, control output component 214, the one or more processors 216, and memory 218 can be electrically and/or communicatively coupled to one another to perform one or more of the functions of the TOF sensor device 202. In some embodiments, components 204, 206, 208, 210, 212, and 214 can comprise software instructions stored on memory 218 and executed by processor(s) 216. TOF sensor device 202 may also interact with other hardware and/or software components not depicted in FIG. 2. For example, processor(s) 216 may interact with one or more external user interface devices, such as a keyboard, a mouse, a display monitor, a touchscreen, another sensor, a network, a safety device, or other such interface devices.

Illumination component 204 can be configured to control emission of light by the sensor device. TOF sensor device 202 may comprise a laser, light emitting diode (LED), remote phosphor, or other type of light source under the control of illumination component 204. For sensor devices that employ pulsed TOF principles, illumination component 204 emits light pulses directed to the viewing field, so that time-of-flight information can be generated by the TOF sensor device 202 based on the reflected light pulses returned to the sensor's photo-receiver array. The TOF distance determination component 206 can be configured to derive distance information for respective pixels of an image of the viewing space based on analysis of light reflected from objects and surfaces within the viewing space (e.g., using either pulsed TOF principles or using phase shift measurement principles), and to generate a depth map for the viewing area based on the distance information. The focal adjustment component 208 can be configured to adjust a focal length of the TOF sensor device's lens until one or more objects within the viewing space are determined to be within sharpest focus.

The focal length determination component 210 can be configured to determine a current focal length of the sensor device's lens and to provide this focal length information to the distance adjustment component 212. The distance adjustment component 212 can be configured to apply correction factors to the distance values generated by the TOF distance determination component 206 based on the focal length provided by the focal length determination component 210.

The control output component 214 can be configured to control one or more sensor outputs based on results generated by the TOF distance determination component 206 (as modified by the distance adjustment component 212 based on focal length information). For industrial applications, this can include, for example, sending a control signal to an industrial device or controller to perform a control action, initiating a safety action (e.g., removing power from a hazardous machine, switching an industrial system to a safe operating mode, etc.), sending a feedback message to a display device (e.g., a human-machine interface, a personal mobile device, etc.), sending depth map data to an on-board computer in a mobile vehicle, or other such output.

The one or more processors 216 can perform one or more of the functions described herein with reference to the systems and/or methods disclosed. Memory 218 can be a computer-readable storage medium storing computer-executable instructions and/or information for performing the functions described herein with reference to the systems and/or methods disclosed.

Figure 3:
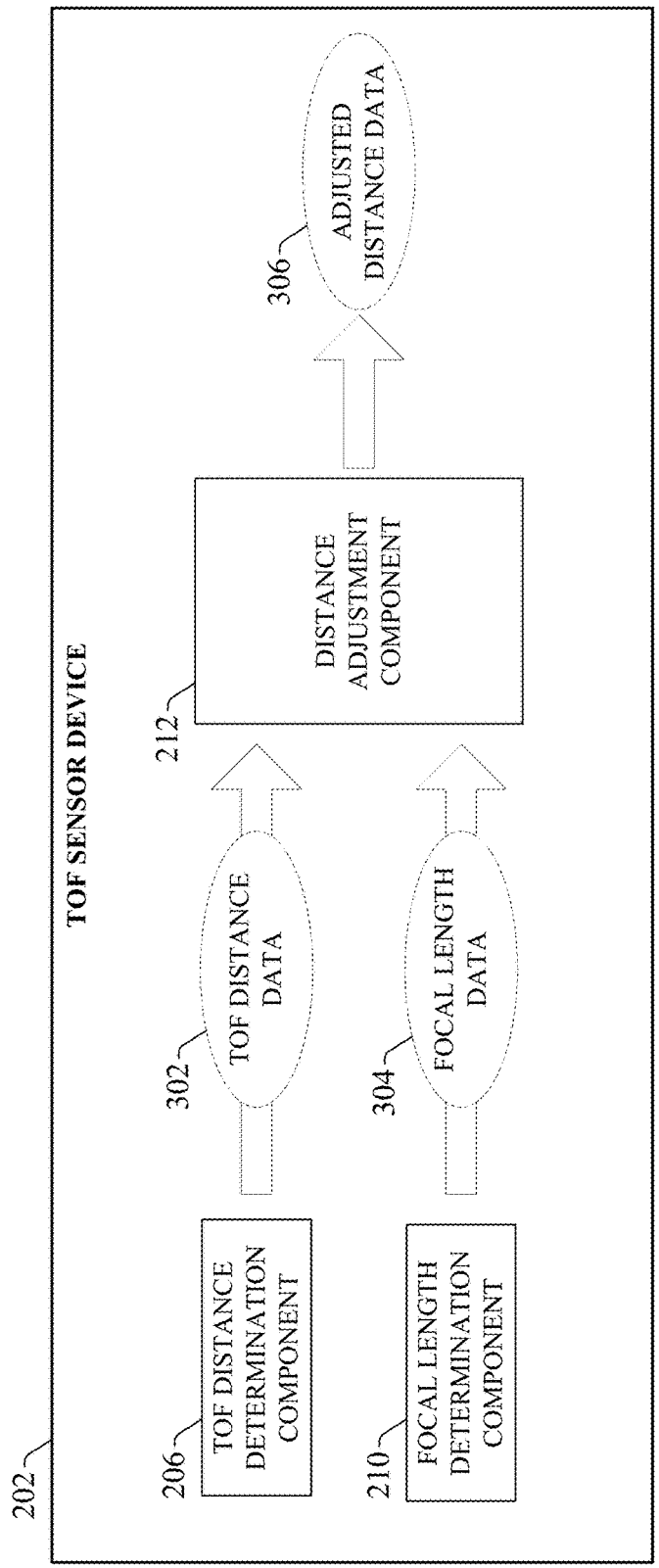
FIG. 3 is a block diagram illustrating general principles of distance data correction using focal length.

FIG. 3 is a block diagram illustrating general principles of distance data correction by TOF sensor device 202. Distance adjustment component 212 is configured to receive data from two channels. TOF distance determination component 206 provides TOF distance data 302 over the first channel. The TOF distance data 302 comprises a calculated distance value corresponding to one or more pixels of a captured image of the viewing space, where the TOF distance determination component 206 determines the distance value based on either pulsed TOF analysis or phase measurement analysis of light reflected from the viewing space. In general TOF distance determination component 206 determines a distance value for respective pixels of an image of the viewing space, thereby creating a depth map for the viewing space. The depth map indicates, for each pixel, a distance of an object or surface corresponding to that pixel from the TOF sensor device.

In addition to the TOF distance data 302, distance adjustment component 212 receives focal length data 304 from the focal length determination component 210 via a second channel. The focal length data 304 represents the current focal length of the TOF sensor device's lens. Since the TOF sensor device 202 supports auto-focus capability, the lens will focus on objects of interest within the viewing area. For example, when a new object enters the viewing space (e.g., a person, a trolley, a forklift, etc.), the TOF sensor device will automatically focus on this new object, and maintain focus on the object as the object traverses through the viewing space. The focal length determination component 210 can examine the current focal length of the camera lens and provide this information to the distance adjustment component 212.

Since the focal length of the lens is indicative of distance of the object upon which the lens is focused, the focal length can be used to calibrate the distance measurements generated by the TOF sensor device. For example, distance adjustment component 212 may generate a correction factor based on a comparison of the focal length data 304 with the TOF distance data 302, and apply the correction factor to yield adjusted distance data 306. In some embodiments, TOF sensor device 202 may continuously capture the focal length and adjust each TOF distance measurement as the measurements are received from the TOF distance determination component 206. In other embodiments, the TOF sensor device 202 may be configured to execute a calibration sequence either on demand or periodically. When such a calibration sequence is initiated, the TOF sensor device 202 may perform a single comparison between the current focal length and the measured TOF distance for a pixel corresponding to an object within the viewing space, and recalibrate the TOF distance determination component 206 (or the distance adjustment component 212) based on a result of the comparison.

Figure 4:
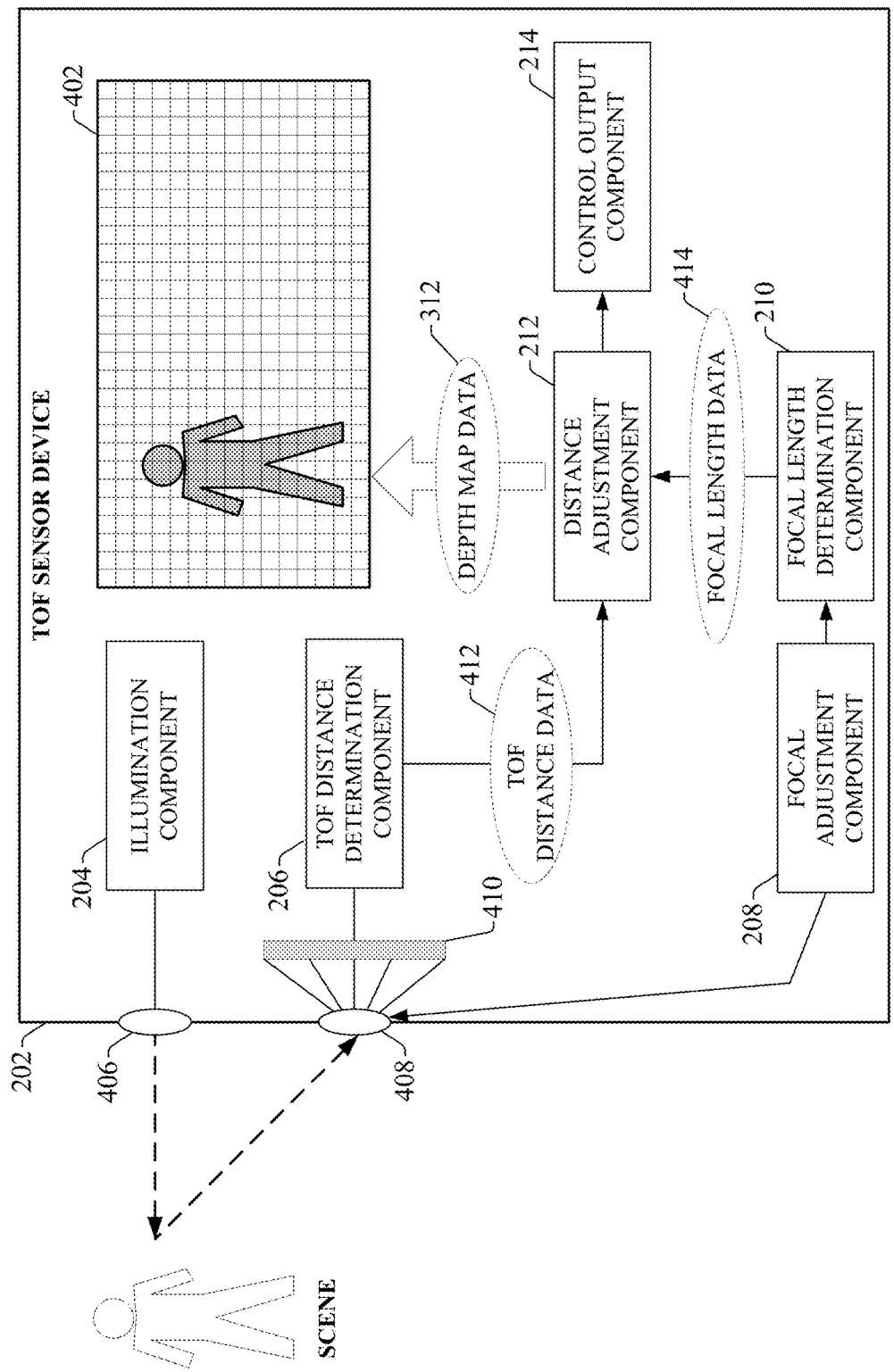
FIG. 4 is a block diagram illustrating operation of a TOF sensor device that uses focal length to correct distance values.

FIG. 4 is a block diagram illustrating operation of the TOF sensor device 202 according to one or more embodiments. In this example, illumination component 204 controls emission of light (e.g., from an LED, laser light, or remote phosphor light source) to the viewing field via lens element 406. For example, if TOF sensor device 202 employs pulsed time-of-flight principles for measuring distance, illumination component 204 may project a wide beam of light pulses (e.g., a cone-shaped beam) over the viewing field. In some embodiments, illumination component 204 can project a wide, substantially planar beam of LED illumination to the viewing field. For scanning type devices, illumination component 204 can sweep this planar beam over an angular range across the viewing area in an oscillatory manner to facilitate collection of image data over the entire viewing range. In other embodiments, the beam may remain static (trained in a fixed direction) so that objects can be detected and identified as they pass through the plane of the beam. In yet another example, illumination component 204 may project a wide beam of light over the viewing field (e.g., a cone-shaped beam).

Receiving lens element 408 receives light reflected from the viewing field and directs the reflected light to a photo-receiver array 410, which generates respective electrical outputs for each pixel of the array as a function of the intensity of the light received at each photo-receiver. TOF distance determination component 206—which can be an integrated component of photo-receiver array 410—can perform TOF analysis (also referred to as 3D analysis) on the pixels to determine a distance value associated with each pixel. The distance value represents the distance of a point on an object or surface corresponding to the pixel from the sensor device. The analysis technique employed by the TOF distance determination component 206 depends on the type of illumination and TOF analysis supported by the device. For example, for TOF sensor devices that employ phase shift analysis, the TOF distance determination component 206 can monitor the phase shift of a reflected light beam received at a photo-receiver and compare this phase shift with the phase of the light beam emitted by the illumination component 204. The distance is then determined as a function of the relative phase shift between the emitted and received light. Other types of imaging sensor that employ pulsed light illumination measure the time duration between emission of a light pulse by the illumination component 204 and receipt of a reflected light pulse at the photo-receiver 410 for each pixel, and determining the distance as a function of this duration. In such embodiments, the TOF distance determination component 206 may monitor the electrical output of the photo-receiver (which is a function of the intensity of light incident on the surface of the photo-receiver) and generate a waveform representing the reflected light pulse. The time at which the light pulse was received at the receiving lens element 408 can then be determined based on an optimized signal analysis (e.g., based on an integral of the pulse waveform, a maximum or correlation function, etc.). The TOF distance determination component 206 can then compare the time at which the light pulse was received with the time at which the emitted light pulse was sent by the illumination component 204. The difference between the two times represents the time-of-flight for the pulse, from which the TOF distance data 412 for the pixel corresponding to the photo-receiver can be derived. By determining a distance value for each pixel in the pixel array 402 representing the viewing space, depth map data 312 can be derived for array.

Based on analysis of the pixel array 402 together with depth information for each pixel of the array, the TOF sensor device may classify objects detected in the viewing space (e.g., a human, a vehicle, a product, etc.), as well as a speed, acceleration, and/or trajectory of the object. Depending on the particular application being executed by the TOF sensor device 202, control output component 214 can be instructed to generate a suitable control, safety, or feedback output when one or more of the object classification, speed, acceleration, and/or trajectory satisfies a defined criterion. In some embodiments, control output component 214 may interface with a control device (e.g., an industrial controller, a safety relay, an on-board computer for a motor vehicle, etc.) over a hardwired or networked connection, and issue control instructions to the control device based on identity, position, and behavior of objects observed in the viewing field. In an example scenario, based on analysis of the pixel array 402 and associated depth map data 312, the TOF sensor device 202 may identify that a plant employee has entered the viewing field, and that the employee's current location, speed, acceleration, and trajectory may place the employee within a potentially hazardous area near a controlled industrial machine. In response, the control output component 214 is instructed to issue a command to the industrial controller to place the machine in a safe mode (e.g., by placing the machine in an idle mode or a slowed operation mode, or by instructing a safety relay to remove power from certain movable components of the machine). In another example scenario, the control output component 214 may be configured to generate feedback information to be rendered on a display device based on object identification and behavior. This can include, for example, customized warning messages recommending that a user follow an alternate path or relocate to a safe area within the monitoring area. For embodiments of the TOF sensor device 202 that support facial recognition, feedback messages generated by control output component 214 may also be further customized based on an identity of the employee detected within the viewing field. Control output component 214 may interface with a display device mounted within the monitored area, or may be targeted to a personal device associated with the identified employee.

TOF sensor device 202 includes a focal adjustment component 208 configured to automatically focus receiving lens element 408 on one or more objects within the viewing space. In some embodiments, focal adjustment component 208 can be configured to detect an object within the viewing area that satisfies one or more criteria (e.g., based on analysis of pixel array data) and to control the receiving lens element 408 to maintain focus on the object while the object remains within the viewing space.

Focal length determination component 210 can be configured to determine the current focal length of the receiving lens element 408. This focal length data can be retrieved, for example, from the focal adjustment component 208. Since the current focal length of the receiving lens element 408 is a function of the distance (from the TOF sensor device 202) of an object on which the lens is focused, the TOF sensor device 202 can use the focal length data 414 to cross-check the TOF distance data 412 measured by the TOF distance determination component 206. Accordingly, to ensure that accurate TOF distance measurement values are used to generate the depth map data 312, the distance adjustment component 212 can apply an error correction to the TOF distance data 412 (or perform a re-calibration of the TOF distance determination component 206 itself) based on the focal length data 414 provided by focal length determination component 210.

In some embodiments, distance adjustment component 212 can execute an error offset correction algorithm that generates a correction factor for a TOF distance value as a function of the difference Δd between the TOF distance value measured by the TOF distance determination component 206 and the current focal length of the receiving lens element. The distance adjustment component 212 may further scale the correction factor as a function of the focal length, since the magnitude of the error offset may be directly proportional to the distance of the object. Thus, the correction factor generated by the distance adjustment component 212 may conform to either $$\text{Correction factor}=f(\Delta d) \quad (1)$$

or $$\text{Correction Factor}=f(\Delta d, \text{focal distance}) \quad (2)$$

In some embodiments, the distance determination component 212 can continuously adjust the TOF distance data using the focal length data 414 as new TOF distance data 412 is received by the TOF sensor device 202. In other embodiments, rather than performing continuous adjustment of the TOF distance data 412, the distance adjustment component 212 may be configured to perform periodic or scheduled recalibrations of the TOF distance determination component 206 based on focal length data 414. In such embodiments, the focal length determination component 210 may only capture focal length data 414 at selected times (e.g., hourly, daily, weekly, etc.). Distance adjustment component 212 can then compare this focal length data 414 with the TOF distance data 412 for a pixel of an object being measured at that time and re-calibrate the TOF distance determination component 206 based on a result. This recalibration may comprise, for example, adjusting a portion of the TOF distance determination algorithms (e.g., a scale factor) used by the TOF distance determination component 206 to derive TOF distance data 412 to bring the values in line with the focal length data 414. In some embodiments, the calibration may be performed in response to certain detected events; e.g., in response to detection of a new object entering the viewing space, in response to a detection of an object within the viewing space having a brightness or darkness that exceeds a defined threshold, in response to a determination that a temperature or other environmental condition has moved outside a defined range of tolerance, etc.

Although FIG. 4 depicts the focal adjustment component 212 and focal length determination component 210 as using the same optical components as the TOF distance determination component 206 (that is, the same receiving lens 408, photo-receiver array 410, etc.), some embodiments of TOF sensor device 202 may also include a second optical and sensor path dedicated to determining focal length information (e.g., focal length data 414) for the purpose of distance determination or correction.

Since TOF sensor device 202 employs two separate and diverse principles for determining distance information for pixels corresponding to an object, some embodiments of TOF sensor device 202 can be designed to satisfy the high safety integrity level requirements (e.g., SIL, ASIL, Type 4 safety, etc.) of certain types of industrial safety applications. For example, the inclusion of both a TOF distance measurement channel and a focal length determination channel yields a dual channel configuration with diversity, which is a requirement for many safety-rated sensor devices. This makes the TOF sensor device 202 suitable for use in industrial safety applications, which require a high degree of safety integrity. Such safety applications can include, for example, industrial safety applications designed to monitor a hazardous area and reliably perform automated control actions to mitigate risk of injury in response to detection of a potentially unsafe human presence or action, automobile safety applications in which one or more sensors mounted on a vehicle control breaking of the vehicle based on detected risk conditions, or other such applications.

Figure 5:
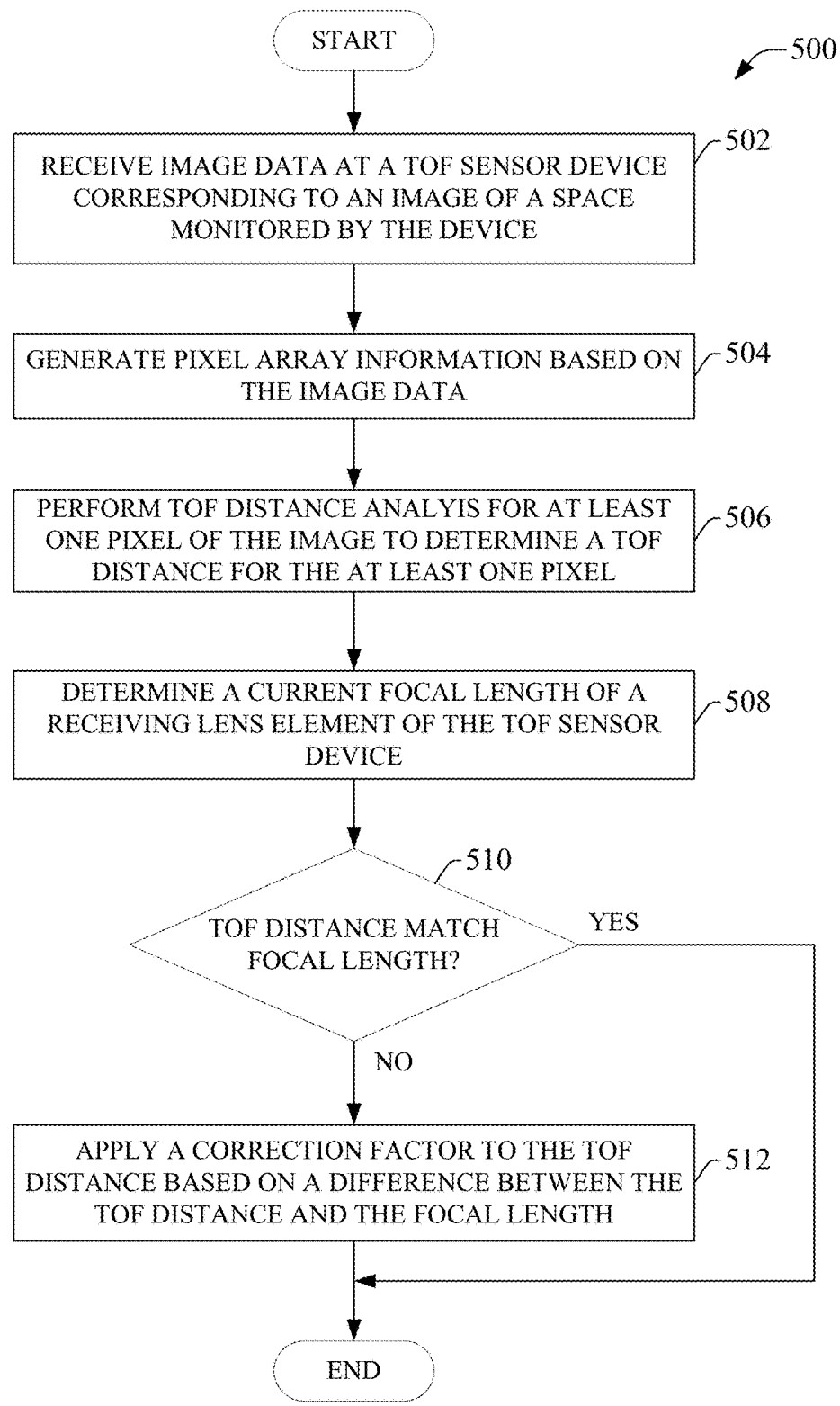
FIG. 5 is a flowchart of an example methodology correcting TOF distance measurements based on a focal length of a receiving lens element.

FIG. 5 illustrates a methodology in accordance with one or more embodiments of the subject application. While, for purposes of simplicity of explanation, the methodologies presented in this disclosure are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 5 illustrates an example methodology 500 for correcting TOF distance measurements based on a focal length of a receiving lens element. Initially, at 502, image data is received at TOF sensor device corresponding to an image of a viewing area monitored by the device. At 504, pixel array information is generated by the imaging sensor device based on the image data received at step 502. At 506, TOF analysis is performed on one or more pixels in order to determine distance information for an object or surface corresponding to the one or more pixels.

At 508, a current focal length of a receiving lens element of the TOF sensor device is determined. The TOF sensor device uses auto-focus capabilities to focus the lens on the object or surface corresponding to the one or more pixels prior to performing the TOF distance analysis at step 506. As such, the current focal length is indicative of the distance of the object or surface from the TOF sensor device. At 510, a determination is made regarding whether the TOF distance matches the focal length. In this regard, the TOF distance may be assumed to match the focal length if the two values are within a defined tolerance range of one another. If the TOF distance matches the focal length, the methodology ends, and no correction factor is applied. Alternatively, if it is determined at step 510 that the TOF distance does not match the focal length, the methodology moves to step 512, where a correction factor is applied to the TOF distance determined at step 506 based on a difference between the TOF distance and the focal length.

FIGS. 6-9 illustrate another approach for determining an absolute distance in a TOF sensor device. According to this approach, the TOF sensor device employs phase measurement as a basic principle for determining the distance of a point on an object or surface from the sensor, and supplements this phase measurement with a pulsed time-of-flight distance measurement in order to refine the distance measurement.

Figure 6:
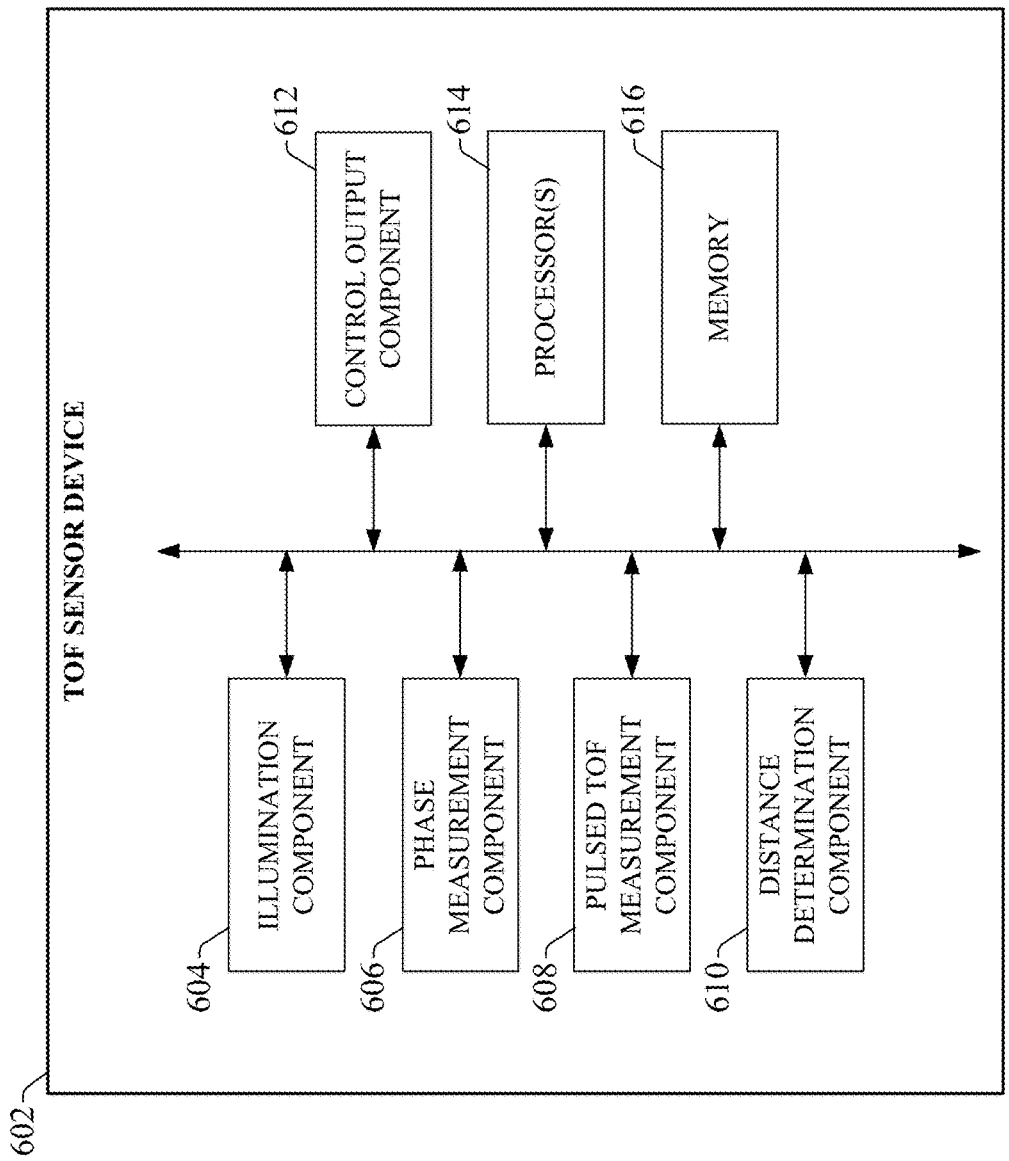
FIG. 6 is a block diagram of an example TOF sensor device that uses both phase measurement and pulsed TOF principles to generate distance information.

FIG. 6 is a block diagram of an example TOF sensor device according to these embodiments. Although FIG. 6 depicts certain functional components as residing on TOF sensor device 602, it is to be appreciated that one or more of the functional components illustrated in FIG. 6 may reside on a separate device relative to TOF sensor device 602 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 602 can include an illumination component 604, a phase measurement component 606, a pulsed TOF measurement component 608, a distance determination component 610, a control output component 612, one or more processors 614, and memory 616. In various embodiments, one or more of the illumination component 604, phase measurement component 606, pulsed TOF measurement component 608, distance determination component 610, control output component 612, the one or more processors 614, and memory 616 can be electrically and/or communicatively coupled to one another to perform one or more of the functions of the TOF sensor device 602. In some embodiments, components 604, 606, 608, 610, and 612 can comprise software instructions stored on memory 616 and executed by processor(s) 614. TOF sensor device 602 may also interact with other hardware and/or software components not depicted in FIG. 6. For example, processor(s) 614 may interact with one or more external user interface devices, such as a keyboard, a mouse, a display monitor, a touchscreen, another sensor, a network, a safety device, or other such interface devices.

Similar to the illumination component 204 of FIG. 2, illumination component 604 is configured to control emission of light by the TOF sensor device 602. In this example, the illumination component 604 is configured to emit a standard light beam for distance measurements using phase shift measurement principles, as well as light pulses for distance measurements using pulsed time-of-flight principles. Phase measurement component 606 can be configured to determine a distance for a pixel corresponding to an object or surface using phase shift measurement principles; that is, by calculating the distance as a function of the phase shift between the light beam emitted by illumination component 604 and a reflected light beam received at the sensor for that pixel. The pulsed TOF measurement component can be configured to generate distance data using pulsed time-of-flight principles; that is, by determining the time duration between emission of a light pulse by illumination component 604 and detection of a return pulse received at the TOF sensor device 602.

Distance determination component 610 can be configured to calculate distance values for respective pixels based on distance information provided by the phase measurement component 606 and pulsed TOF measurement component 608. Control output component 612 can perform similar functions to control output component 214 of FIG. 2; e.g., generating control and/or feedback output when the distance information or other characteristics of the monitored scene satisfy one or more criteria. The one or more processors 614 can perform one or more of the functions described herein with reference to the systems and/or methods disclosed. Memory 616 can be a computer-readable storage medium storing computer-executable instructions and/or information for performing the functions described herein with reference to the systems and/or methods disclosed.

Figure 7:
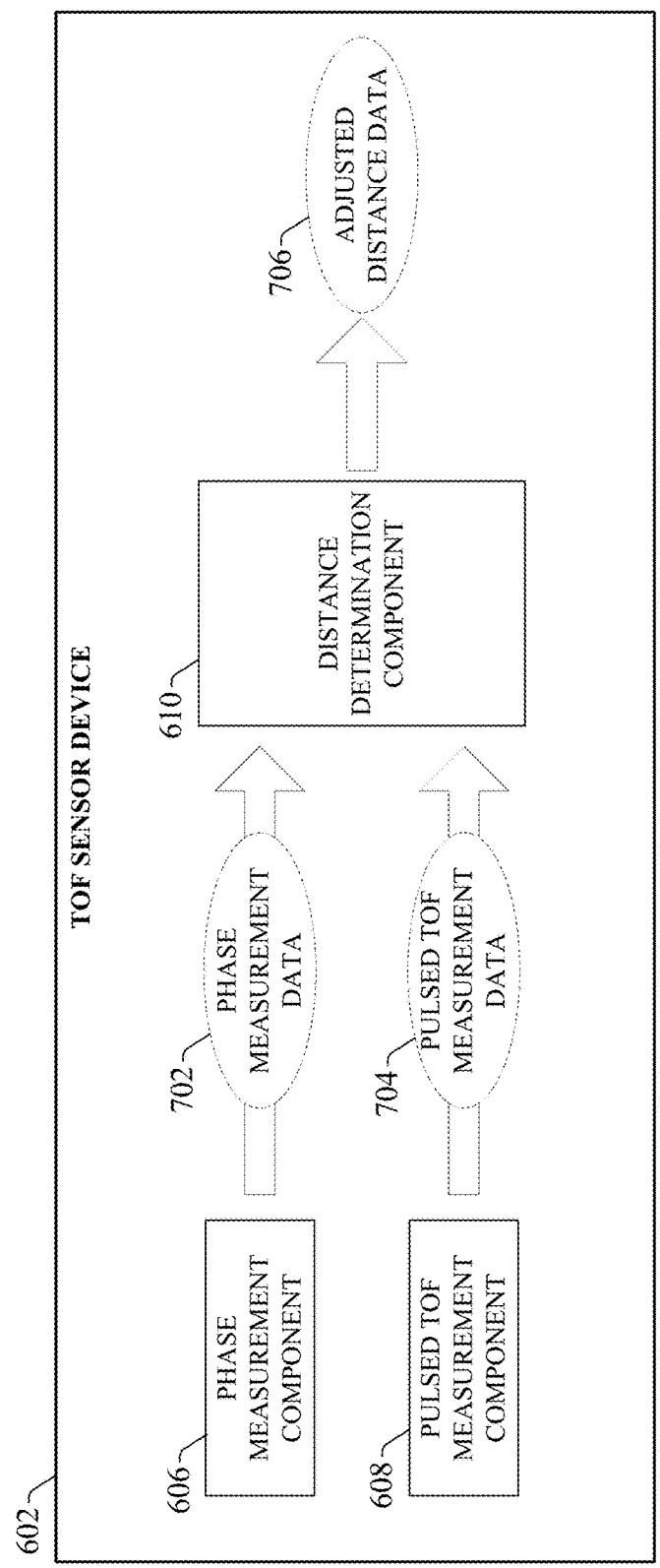
FIG. 7 is a block diagram illustrating general principles of distance data correction using both phase measurement and pulsed TOF principles.

FIG. 7 is a block diagram illustrating general principles of distance data correction by TOF sensor device 602. As noted above, phase shift measurement principles can be used to determine the distance of a point on an object by projecting a light beam at the object, receiving reflected light from the object at the sensor, and comparing the phase of the emitted beam with the phase of the reflected beam seen at the sensor. This phase difference is indicative of the total distance traversed by the light beam (the distance outward to the object plus the return distance from the object to the sensor), from which the distance between the sensor and the object can be derived (e.g., by taking half of the total distance traveled by the beam).

Accurate distance measurement for objects at longer distances can be difficult using phase shift measurement principles exclusively, since phase offsets repeat every 360 degrees. That is, while accurate distance measurements can be obtained when the phase difference between the emitted and returned light is less than 360 degrees, phase shifts in excess of 360 degrees (corresponding to distances greater than half the wavelength of the emitted light) are indistinguishable from offsets that are less than 360 degrees. For example, if the distance between the sensor and the object yields a measured phase difference of 270 degrees, sensors that use only phase shift measurement principles to determine distance may have no way of knowing whether an additional 360 degrees (corresponding to a full wavelength of additional total distance) was traversed prior to the measured 270 degree phase difference. Because of this limitation arising from the periodic nature of phase shift measurement, sensors that use phase shift measurement exclusively may only be accurate for distances that are less than half the wavelength of the emitted light beam (that is, less than one full wavelength of total round-trip distance to the object and back to the sensor).

To correct this source of measurement error, TOF sensor device 602 can supplement phase shift measurement calculation techniques with pulsed TOF distance measurement in order to eliminate the phase shift uncertainties described above and obtain accurate distance measurements regardless of distance. Accordingly, phase measurement component 606 can generate phase measurement data 702 for one or more pixels based on a determined phase difference between an emitted light beam and a reflected light beam received at the sensor device. During the same measurement cycle, pulsed TOF measurement component 608 can generate pulsed TOF measurement data 704 for the one or more pixels by measuring the time difference between emission of a light pulse by the illumination component and receipt of a reflected pulse at the TOF sensor device. These two sets of data are provided to distance determination component 610, which can modify the distance value produced by the phase measurement data 702 based on the pulsed TOF measurement data 704 produced by the pulsed TOF measurement component 608 to yield adjusted distance data 706 representing a corrected distance value for the one or more pixels.

For example, the distance determination component 610 may determine that the raw phase difference between the emitted and received light beams is 180 degrees. If the emitted light beam has a wavelength of 15 meters, this yields a raw distance value of one quarter of the wavelength, or 3.75 meters. However, it is not known based on the phase measurement data alone whether the phase of the returned light beam had shifted by an additional 360 degrees (representing an additional total round-trip distance equivalent of one wavelength, or 15 meters) or a multiple of 360 degrees in addition to the measured 180 degree offset, since such an additional 360 degree shift would not be detectable by merely examining the phase difference between the emitted and returned beams. Consequently, the actual distance of the measured object may be 3.75 meters, 11.25 meters (3.75+7.5), or 18.75 meters (3.75+7.5+7.5).

To resolve this uncertainty, distance determination component 610 can examine the pulsed TOF measurement data 704 to determine which of the possible phase measurement results is correct. For example, if the pulsed TOF measurement data 704 yields a result approximately equal to 11.25 meters (that is, a result that exceeds the phase-measured distance by approximately one wavelength), the distance determination component 610 assumes that an additional distance equal to half a wavelength (7.5 meters) should be added to the 3.75 meter value yielded by the phase measurement data 702 to yield the adjusted distance value. In general, if it is determined that the pulsed time-of-flight distance exceeds the phase-measured distance by a length approximately equivalent to the wavelength of the light beam—or a multiple of this length—the wavelength or its multiple is added to the phase measured distance to obtain a corrected distance.

Figure 8:
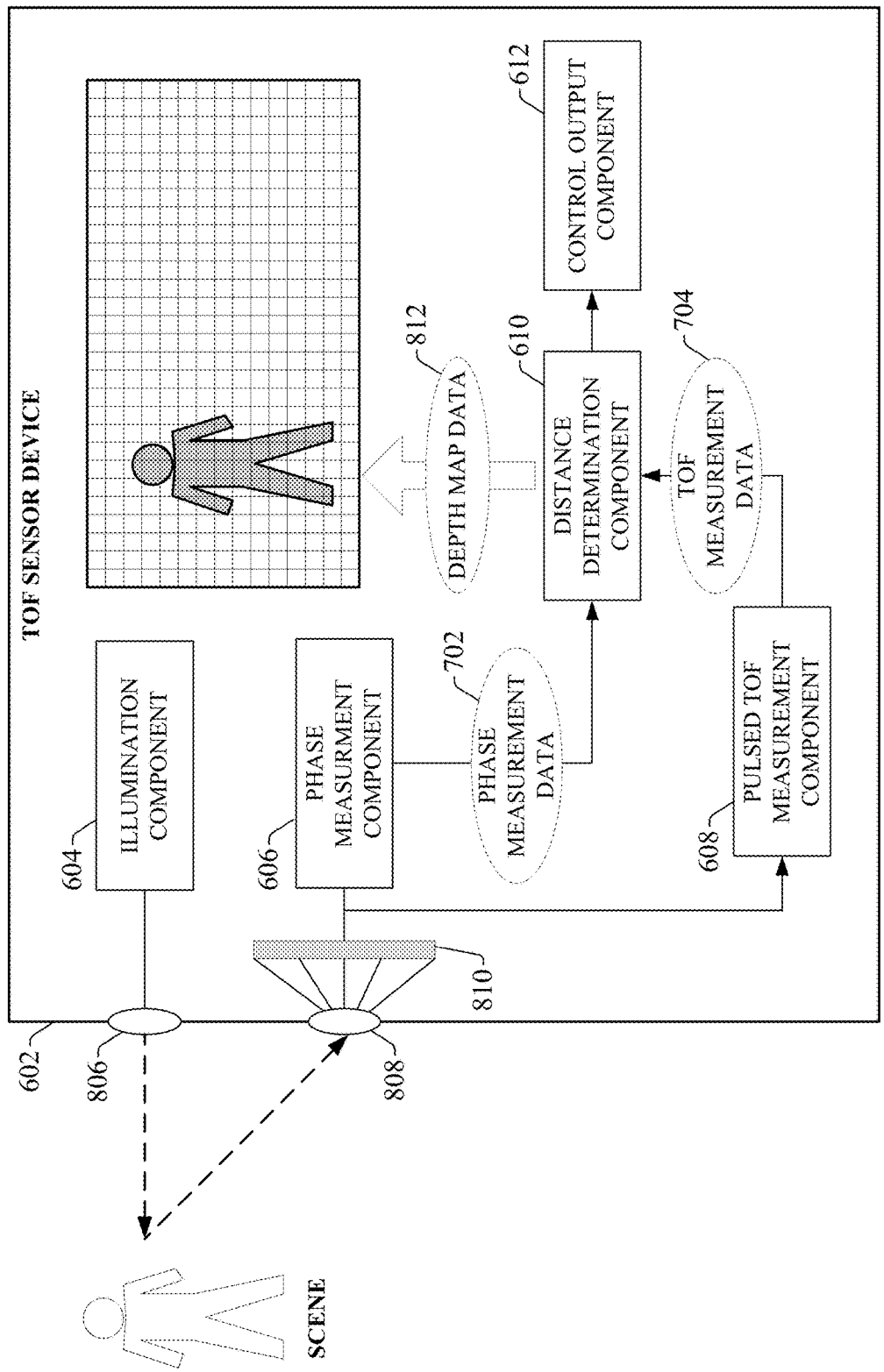
FIG. 8 is a block diagram illustrating operation of a TOF sensor device that uses both phase measurement and pulsed TOF principles.

FIG. 8 is a block diagram illustrating components of the TOF sensor device 602 according to one or more embodiments. As in previous examples, illumination component 604 emits non-pulsed a light beam to a scene via emitting lens element 806. The beam is reflected from the objects and surfaces within the scene, and the reflected light is received at receiving lens element 808 and directed to a photo-receiver array 810, which generates pixel data for the scene. Phase measurement component 606 (which may be an integral component of photo-receiver array 810 in some embodiments) determines the phase difference between the emitted and reflected light beam for each pixel to yield phase measurement data 702.

Within the same measurement cycle, illumination component 604 also emits a light pulse to the scene. Objects and surfaces within the scene reflect the pulse back to the sensor device 602, which receives the reflected pulse at receiving lens element 808. Pulsed TOF measurement component 608 generates pulsed TOF measurement data 704 based on a measured time duration between emission of the light pulse and receipt of the reflected pulse at the receiving lens element 808 for each pixel. The TOF measurement data comprises time-of-flight distance information for respective pixels based on these time durations.

For each pixel, distance determination component 610 generates a distance value representing a distance of an object or surface corresponding to that pixel from the TOF sensor device 602. This distance value is based on both the phase measurement data 702 and the TOF measurement data 704; e.g., by modifying (if necessary) a first distance value determined using the phase shift measurement approach based on a second distance value determined using the pulsed time-of-flight measurement approach, as described above with reference to FIG. 7. The distance values for all pixels of the image yields depth map data 812 for the image. Depending on the particular application being executed by the TOF sensor device 602, control output component 612 can be instructed to generate a suitable control, safety, or feedback output based on classification, speed, acceleration, and/or trajectory of an object detected within the scene, as determined in part by the distance information, as described in previous examples.

In the example described above, the illumination component 604 is described as emitting the light pulse for the pulsed time-of-flight measurement in a same measurement cycle as the light emitted for the phase measurement, and the distance determination component 610 is described as continuously correcting (if necessary) the phase measurement distance based on the pulsed TOF measurement distance. However, in some embodiments the correction of the phase measurement may only be performed at selected times, or in response to detection of a predefined occurrence. For example, the TOF sensor device 602 may perform only phase measurement during normal circumstances (e.g., when no object of interest is present in the scene). When a new object enters the scene, the sensor device may initiate a pulsed TOF measurement cycle in order to get an accurate distance measurement for the new object. Accordingly, the illumination component 604 emits a light pulse into the viewing scene and uses the resulting TOF measurement data to correctly calibrate the distance value provided by the phase shift measurement. In this way, the sensor device determines whether one or more wavelengths of distance should be added to the phase-measured distance (as described above in connection with FIG. 7). Once the phase measurement distance is correctly calibrated for the object, further correction of the phase-measured distance is not necessary, since the sensor device 602 can track the distance of the object using the corrected distance as a starting point. By applying the pulsed time-of-flight correction only when a new object is initially detected in the viewing scene, the TOF sensor device's overall processing time can be reduced relative to continuously correcting the phase-measured distance values.

In some embodiments, TOF sensor device 602 may support phase offset measurement using two or more different wavelengths. In such embodiments, illumination component 604 may be configured to transmit light beams of two or more different wavelengths (e.g., a 15-meter wavelength beam and a 20-meter wavelength beam, where the 20-meter wavelength signal yields a higher unambiguous range relative to the 15-meter signal). Phase measurement component 606 can measure phase offsets for two or more different signals having different wavelengths, and correlate these results to obtain an unambiguous distance measurement. In these embodiments, the pulsed TOF measurement data can be used to resolve any remaining ambiguity in the distance measurement.

Similar to TOF sensor device 202 described above in connection with FIGS. 2-5, TOF sensor device 602 employs two distinct distance measurement channels (phase measurement and pulsed TOF, respectively). As such, some embodiments of TOF sensor device 202 satisfy the safety integrity level requirements of some defined safety standards (e.g., SIL, ASIL, Type 4, etc.) by providing a dual channel configuration with diversity. Such embodiments of TOF sensor device 602 are therefore suitable for use in industrial safety applications.

Figure 9:
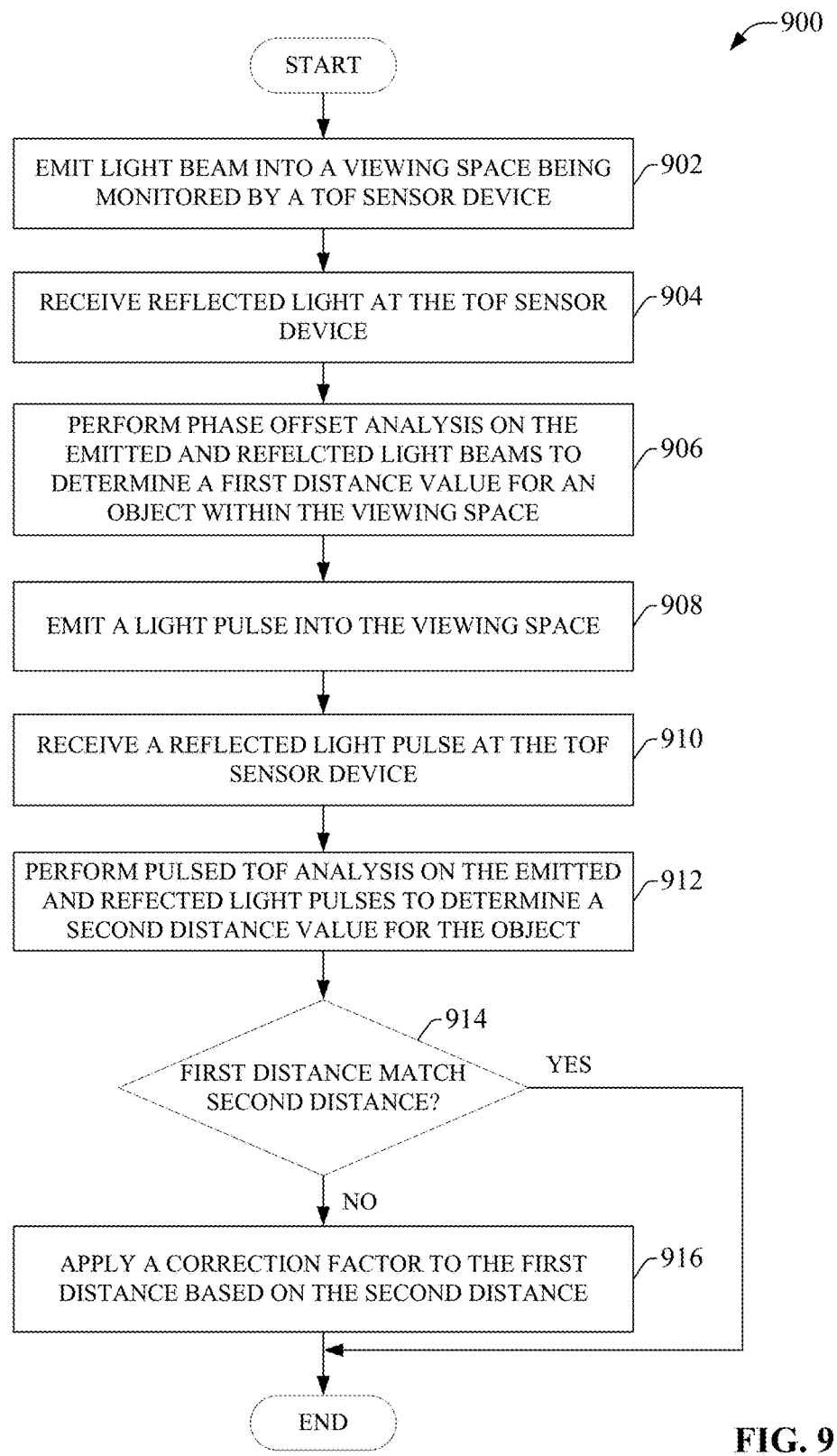
FIG. 9 is a flowchart of an example methodology for correction of phase-measured distance values using pulsed time-of-flight distance values.

FIG. 9 illustrates an example methodology 900 for correction of phase-measured distance values using pulsed time-of-flight distance values. Initially, at 902, a light beam is emitted into a viewing space being monitored by a TOF sensor device. At 904, a reflected light beam is received at the TOF sensor device (e.g., via a receiving lens element of the device). At 906, phase shift analysis is performed on the emitted and reflected light beams to determine a first distance value for a pixel corresponding to an object within the viewing space. The first distance value can be obtained, for example, by determining the phase difference between the emitted and reflected beams and calculating the distance as a function of the phase shift and the known wavelength of the light beam.

At 908, a light pulse is emitted into the viewing space. At 910, a reflected light pulse is received at the TOF sensor device. At 912, pulsed TOF analysis is performed on the emitted and reflected light pulses to determine a second distance value for the pixel corresponding to the object. The second distance can be obtained, for example, by measuring a time duration between emission of the light pulse and detection of the reflected light pulse at the TOF sensor device.

At 914, a determination is made regarding whether the first distance value matches the second distance value. In this regard, the first distance value may be considered to match the second distance value if the first and second distance values are within a define tolerance range of one another. If it is determined at 914 that the first distance value matches the second distance value, the methodology ends and no correction factor is applied. Alternatively, if the first and second distances do not match, the methodology moves to step 916, where a correction factor is applied to the first (phase-measured) distance value based on the second (pulsed TOF) distance value. For example, if the second distance value is determined to exceed the first distance value by a length of approximately one full wavelength of the light beam, the first distance value can be corrected by adding a distance equivalent to one wavelength.

FIGS. 10-13 illustrate another approach for determining an absolute distance in a TOF sensor device according to one or more embodiments. In this example, the variation in the intensity of reflected light received from an object is compared with the variation of the object's distance from the TOF sensor. Since the intensity of the reflected light is known to have an inverse-square relationship with the distance of the object (i.e., the intensity varies as the square of the distance), the TOF sensor device can compensate for distance measurement errors by comparing these variations.

Figure 10:
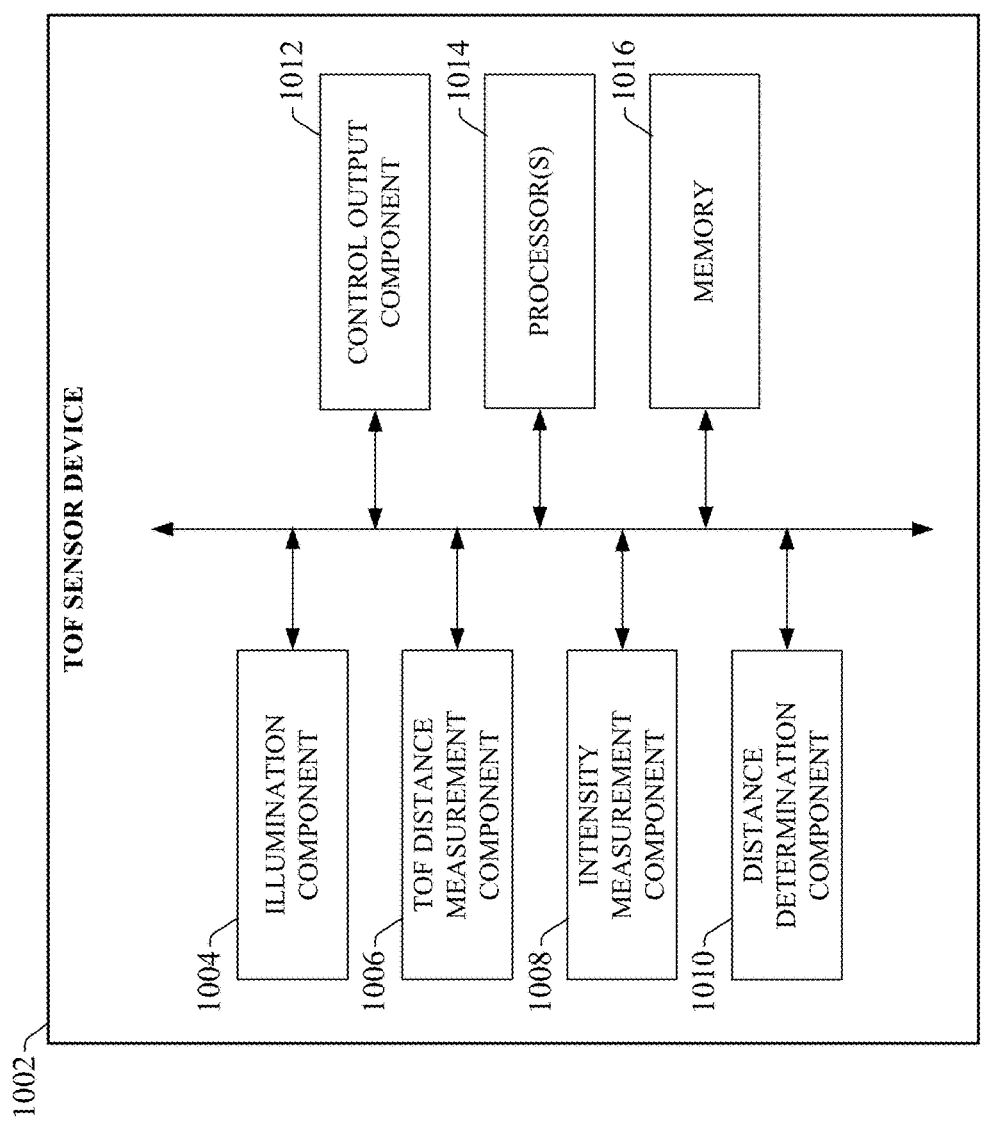
FIG. 10 is a block diagram of an example TOF sensor device that compares distance variations with light intensity variations to perform distance correction.

FIG. 10 is a block diagram of an example TOF sensor device according to these embodiments. Although FIG. 10 depicts certain functional components as residing on TOF sensor device 1002, it is to be appreciated that one or more of the functional components illustrated in FIG. 10 may reside on a separate device relative to TOF sensor device 1002 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 1002 can include an illumination component 1004, a TOF distance measurement component 1006, an intensity measurement component 1008, a distance determination component 1010, a control output component 1012, one or more processors 1014, and memory 1016. In various embodiments, one or more of the illumination component 1004, TOF distance measurement component 1006, intensity measurement component 1008, distance determination component 1010, control output component 1012, the one or more processors 1014, and memory 1016 can be electrically and/or communicatively coupled to one another to perform one or more of the functions of the TOF sensor device 1002. In some embodiments, components 1004, 1006, 1008, 1010, and 1012 can comprise software instructions stored on memory 1016 and executed by processor(s) 1014. TOF sensor device 1002 may also interact with other hardware and/or software components not depicted in FIG. 10. For example, processor(s) 1018 may interact with one or more external user interface devices, such as a keyboard, a mouse, a display monitor, a touchscreen, another sensor, a network, a safety device, or other such interface devices.

Illumination component 1004 and control output component 1016 can be configured to perform functions similar to those performed by illumination component 204 and control output component 214 of FIG. 2. TOF distance measurement component 1006 can be configured to generate distance information for pixels corresponding to an object within the viewing space based on analysis of reflected light received from the viewing space (e.g., using phase shift measurement or pulsed TOF techniques). Intensity measurement component 1008 can be configured to monitor an intensity of reflected light received from an object within the viewing space. Distance determination component 1010 can be configured to generate an adjusted distance value for one or more pixels corresponding to the object based on the TOF distance information generated by the TOF distance measurement component 1006 and a detected variation of the intensity measured by the intensity measurement component. Control output component 1012 can be configured to control one or more sensor outputs based on results generated by the distance determination component 1010, as described in previous examples.

The one or more processors 1014 can perform one or more of the functions described herein with reference to the systems and/or methods disclosed. Memory 1016 can be a computer-readable storage medium storing computer-executable instructions and/or information for performing the functions described herein with reference to the systems and/or methods disclosed.

Figure 11:
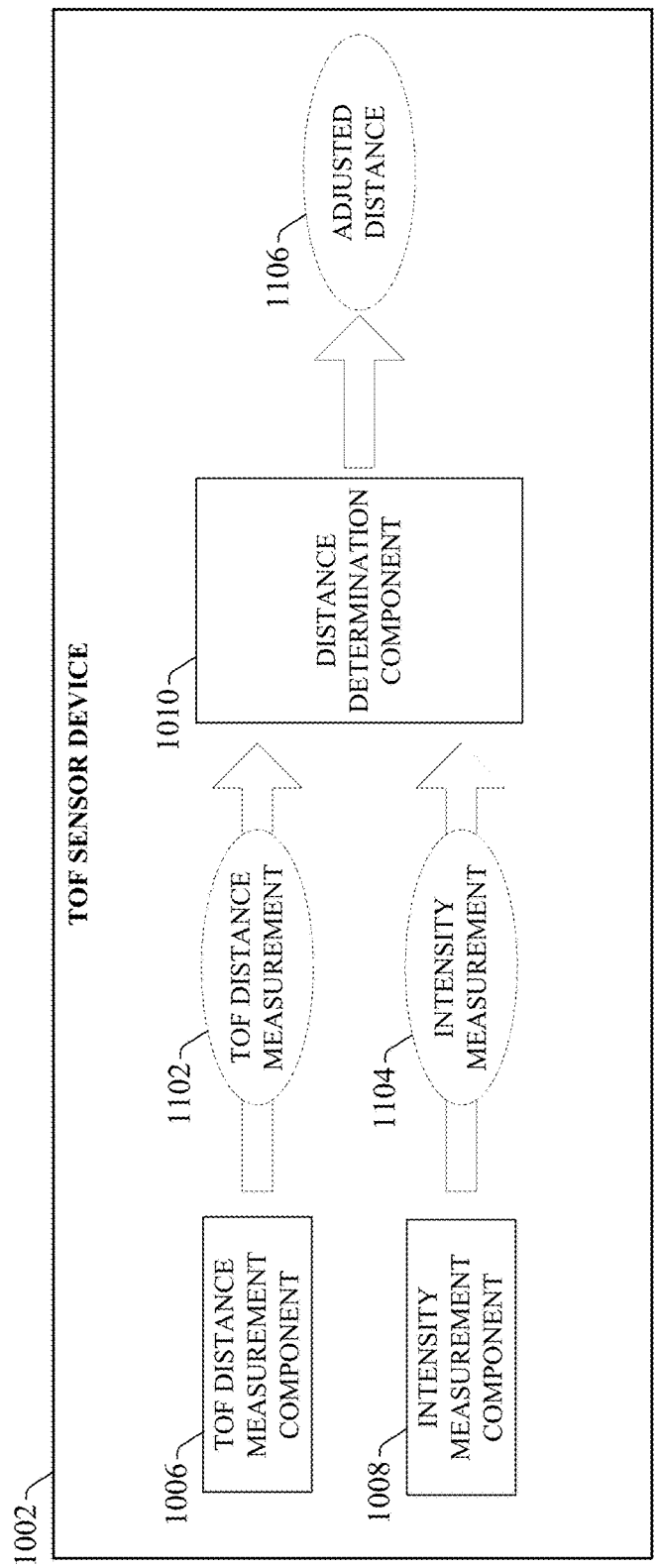
FIG. 11 is a block diagram illustrating correction of distance data based on a comparison of object distance variations with light intensity variations.

FIG. 11 is a block diagram illustrating general principles of distance data correction by TOF sensor device 1002. TOF distance measurement component 1006 determines a TOF distance measurement 1102 for respective pixels corresponding to an object within the viewing space being monitored by TOF sensor device 1002 based on analysis of reflected light received from the object (e.g., using phase shift measurement or pulsed TOF measurement techniques). Additionally, intensity measurement component 1008 monitors the intensity of the light reflected by the object to yield an intensity measurement 1104 for respective pixels of the image. TOF distance measurement 1102 and intensity measurement 1104 for a given pixel are provided to distance determination component 1010, which calculates an adjusted distance 1106 for the pixel based on analysis of the TOF distance and intensity measurements. For example, the distance determination component 1010 may determine an intensity variation of the reflected light over time by monitoring the intensity measurement 1104. Concurrently or substantially concurrently, the distance determination component 1010 can also monitor the change in the TOF distance measurement 1102 over time to determine a distance variation of the object. It is known that the intensity of light reflected from an object should vary as an inverse square of the distance of the object from the TOF sensor device 1002. Accordingly, distance determination component 1010 can compare the intensity variation with the distance variation to determine whether the reflected light intensity is varying as a square of the distance as expected. If the distance determination component 1010 finds a deviation from this inverse square relationship between intensity and distance, the distance determination component 1010 can generate a distance error correction based on the measured deviation and apply this error correction to the TOF distance measurement 1102 to yield the adjusted distance 1106 for the pixel.

Figure 12:
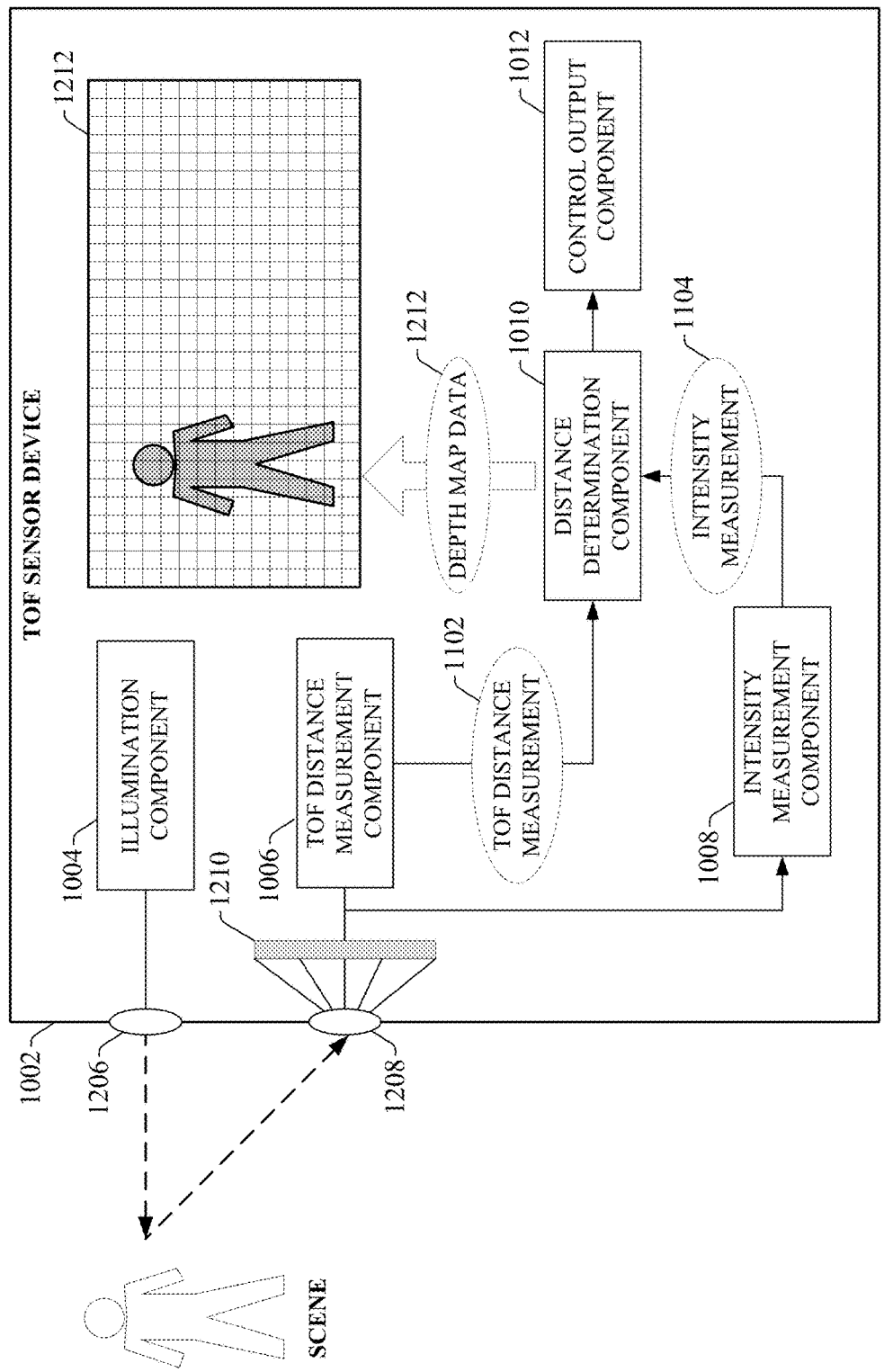
FIG. 12 is a block diagram illustrating operation of a TOF sensor device that corrects distance information based on comparison of object distance variations with light intensity variations.

FIG. 12 is a block diagram illustrating operation of the TOF sensor device 1002 according to one or more embodiments. As described in previous examples, illumination component 1004 emits a beam of light to a scene being monitored by TOF sensor device 1002 via emitting lens element 1206. Light reflected from objects and surfaces within the scene is received at the receiving lens element 1208 of the TOF sensor device 1002, and the receiving lens element 1208 directs the reflected light to photo-receiver array 1210, which generates electrical outputs for respective pixels of the scene as a function of the intensity of the light incident on the array. TOF distance measurement component 1006 (which may be an integrated component of photo-receiver array 1210) generates TOF distance measurement data 1102 for the respective pixels based on analysis of the light received at the receiving lens element 1208 (as measured by the photo-receiver array 1210) and the emitted light beam. TOF distance measurement component 1006 may use either phase shift measurement techniques or pulsed TOF measurement techniques to determine the TOF distance measurement data 1102. A subset of the TOF distance measurement data 1102 for pixels corresponding to an object within the viewing space represents a distance of the object from the TOF sensor device.

The TOF distance measurement data 1102 is provided to the distance determination component 1010. The distance variation measurement component 1010 monitors the TOF distance measurement data 1104 and determines a variation of the distance over time. In some embodiments, the distance variation measurement component 1010 may sample the distance values for one or more pixels corresponding to an object of interest within the viewing space at a high sampling rate, and tabulate the sampled distance values over time to yield a representation of the distance variation.

Concurrent with the distance measurement, intensity measurement component 1008 monitors light intensity for the respective pixels and provides intensity measurement data 1104 to the distance determination component 1010. By monitoring the intensity measurement data 1104 over time, distance determination component determines a variation of the light intensity over time. For example, in a manner similar to the distance variation measurement technique described above, the distance determination component 1010 may periodically sample the intensity values for pixels corresponding to an object of interest, and tabulate these sampled intensity values over time to yield the intensity variation.

The distance determination component 1010 makes a determination, based on the intensity variation data and the distance variation data, regarding whether the measured intensity for a given pixel varies (within a defined tolerance of error) as a square of the measured distance as expected. If the intensity correctly varies as a square of the distance, the measured TOF distance data for that pixel is assumed to be correct and no correction is applied. Alternatively, if the distance determination component 1010 determines that the intensity variation and the distance variation do not properly conform to this inverse square relationship, it is assumed that the TOF distance data requires correction. Accordingly, distance determination component 1010 generates an error correction and applies this error correction to the TOF distance measurement data 1102 to yield a corrected distance value for the pixel. The set of distance values yields depth map data 1212 for the scene.

The error correction generated by the variation distance determination component 1010 can be a function of the nature of the deviation between the distance variation and the intensity variation. For example, the distance determination component 1010 may determine that the deviation from the inverse square relationship between the intensity and the distance is due to an incorrect scale factor being applied to the TOF distance data. Accordingly, the distance determination component 1010 can determine a correct scale factor based on the amount of deviation from the square relationship, and replace the previous scale factor with the new scale factor.

As in previous examples, the error correction sequence described above can be performed continuously by the TOF sensor device, or can be performed at specifically defined times (e.g., periodically, in response to detection of a new object within the scene, in response to a detected change in environmental conditions, in response to manual initiation of a calibration sequence, etc.).

Since TOF sensor device 1002 employs two diverse distance measurement principles (TOF distance measurement and distance measurement based on light intensity variation), some embodiments of the TOF sensor device 1002 thereby satisfy the diverse dual channel requirement of some safety integrity standards, making the sensor suitable for use in industrial safety applications.

Figure 13:
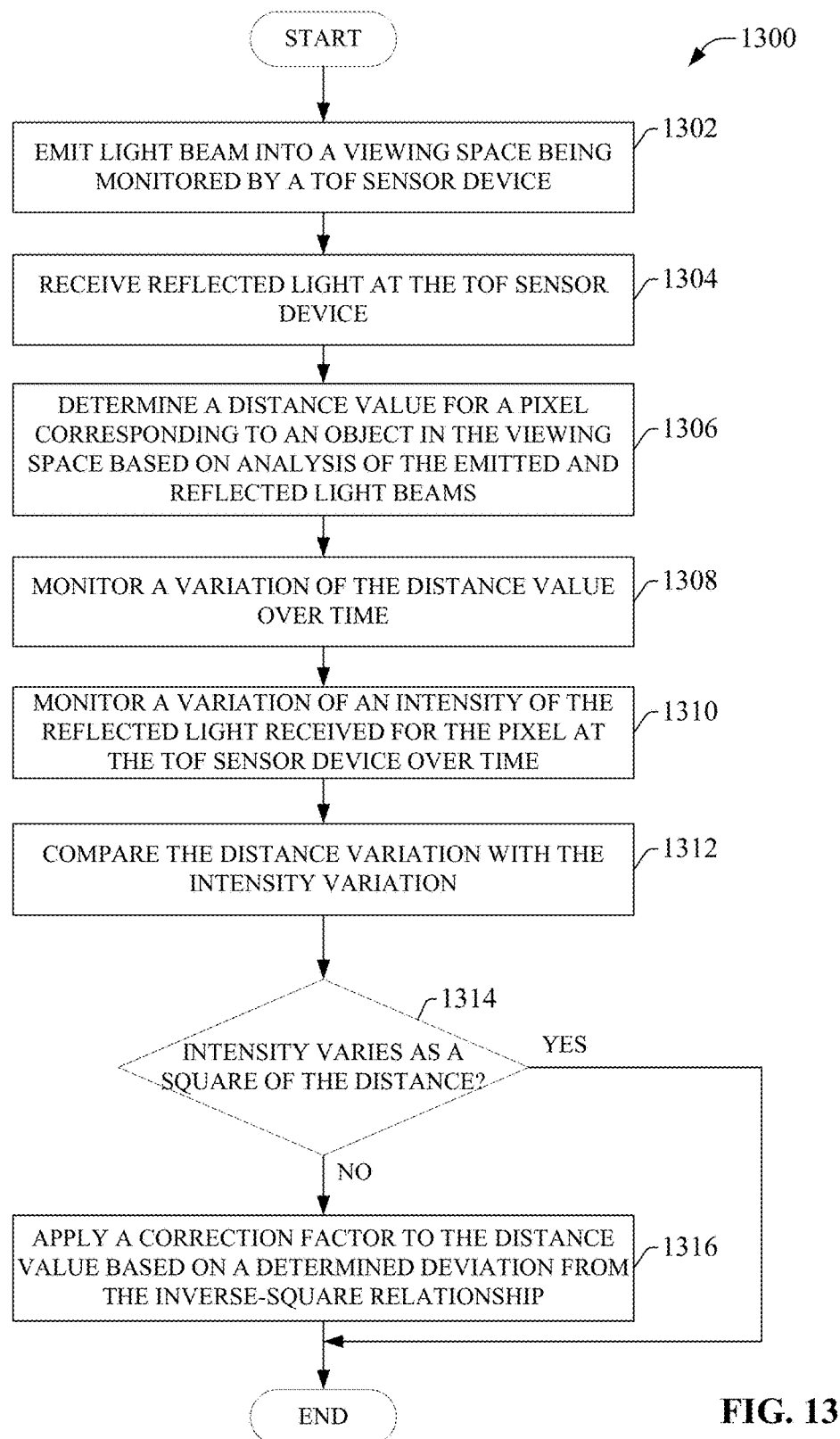
FIG. 13 is a flowchart of an example methodology for correction of measured distance values for an object based on a monitored intensity of light reflected from the object.

FIG. 13 illustrates an example methodology 1300 for correction of measured distance values for an object based on a monitored intensity of light reflected from the object. Initially at 1302, a light beam is emitted into a viewing space being monitored by a TOF sensor device. At 1304, light reflected from objects and surfaces within the viewing space is received at the TOF sensor device. At 1306, a distance value for a pixel corresponding to an object in the viewing space is determined based on analysis of the emitted and reflected light beams (e.g., using either phase measurement or pulsed TOF principles).

At 1308, a variation of the distance value over time is monitored. At 1310, a variation of an intensity of the reflected light measured for the pixel is monitored over time. At 1312, the distance variation determined at step 1308 is compared with the intensity variation determined at step 1310. At 1314, a determination is made, based on the comparison, regarding whether the distance variation and the intensity variation conform to the expected inverse square relationship. If it is determined that the intensity varies as an inverse square of the distance (within a defined tolerance of error), the methodology ends and no correction factor is applied. Alternatively, if it is determined at 1314 that the intensity and distance variations do not conform to the expected inverse square relationship, the methodology moves to step 1316, where a correction factor is generated and applied to the distance value generated at step 1306. The correction factor can be based on a characteristic of the deviation from the expected inverse square relationship, and may comprise modifying a scale factor applied to the measured distance value or other such correction.

FIGS. 14-17 illustrate another approach for determining an absolute distance in a TOF sensor device. This approach combines the TOF distance measurement principle with a second principle for determining distance (e.g., inductive sensing, triangulation, etc.) within the same sensor.

Figure 14:
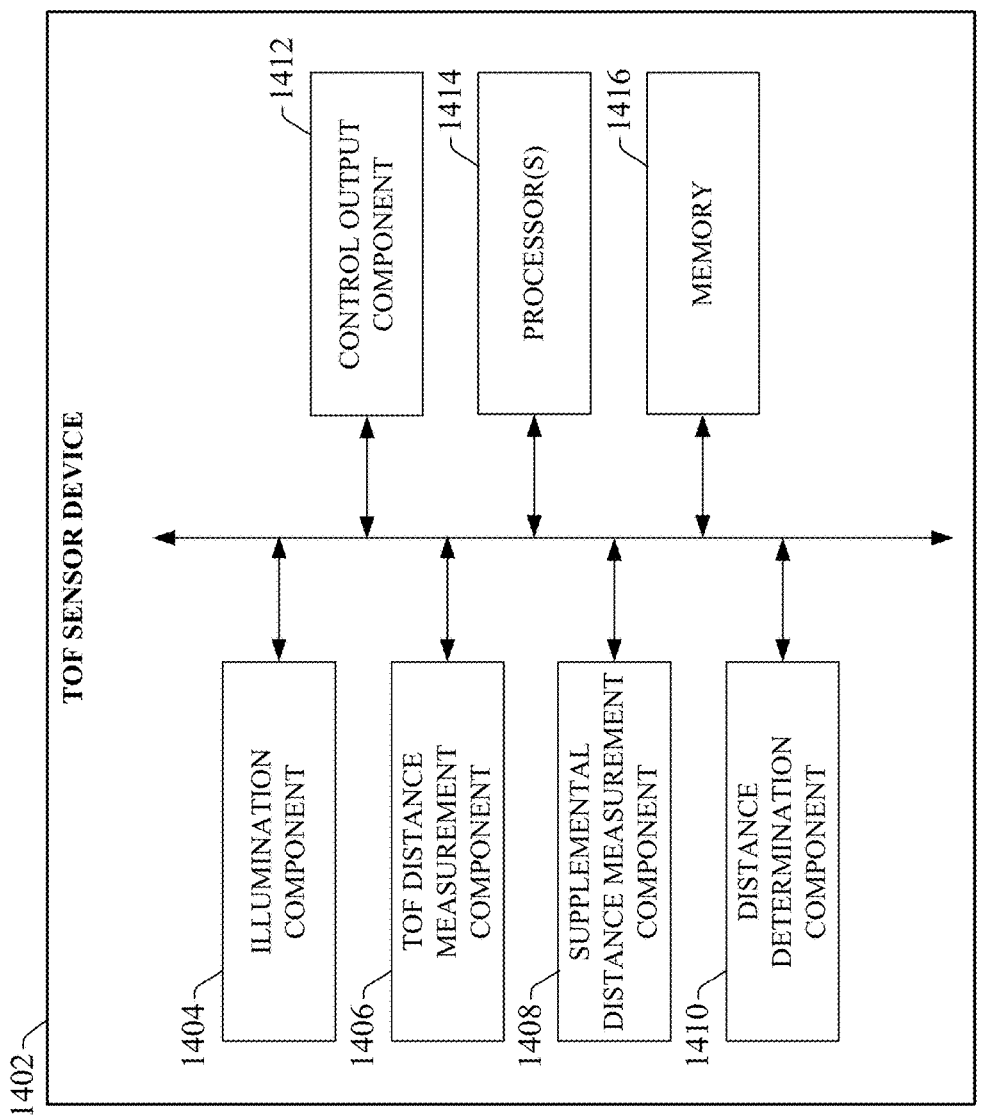
FIG. 14 is a block diagram of an example TOF sensor device that supplements TOF distance measurements with distance measurements generated using a different measurement principle.

FIG. 14 is a block diagram of an example TOF sensor device according to these embodiments. Although FIG. 14 depicts certain functional components as residing on TOF sensor device 1402, it is to be appreciated that one or more of the functional components illustrated in FIG. 14 may reside on a separate device relative to TOF sensor device 1402 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 1402 can include an illumination component 1404, a TOF distance measurement component 1406, a supplemental distance measurement component 1408, a distance determination component 1410, a control output component 1412, one or more processors 1414, and memory 1416. In various embodiments, one or more of the illumination component 1404, TOF distance measurement component 1406, supplemental distance measurement component 1408, distance determination component 1410, control output component 1412, the one or more processors 1414, and memory 1416 can be electrically and/or communicatively coupled to one another to perform one or more of the functions of the TOF sensor device 1402. In some embodiments, components 1404, 1406, 1408, 1410, and 1412 can comprise software instructions stored on memory 1416 and executed by processor(s) 1414. TOF sensor device 1402 may also interact with other hardware and/or software components not depicted in FIG. 14. For example, processor(s) 1414 may interact with one or more external user interface devices, such as a keyboard, a mouse, a display monitor, a touchscreen, another sensor, a network, a safety device, or other such interface devices.

Illumination component 1404 and control output component 1412 can be configured to perform functions similar to those performed by illumination components and control output components described above in previous examples. TOF distance measurement component 1406 can be configured to generate distance information for an object within the viewing space based on analysis of reflected light received from the viewing space (e.g., using phase shift measurement or pulsed TOF techniques). Supplemental distance measurement component 1408 can be configured to generate a supplemental distance value for the object using a different distance measurement principle. Distance determination component 1410 can be configured to generate corrected distance information for pixels of the object based on the TOF distance values generated by the TOF distance measurement component and the supplemental distance values generated by the supplemental distance measurement component 1408.

The one or more processors 1414 can perform one or more of the functions described herein with reference to the systems and/or methods disclosed. Memory 1416 can be a computer-readable storage medium storing computer-executable instructions and/or information for performing the functions described herein with reference to the systems and/or methods disclosed.

Figure 15:
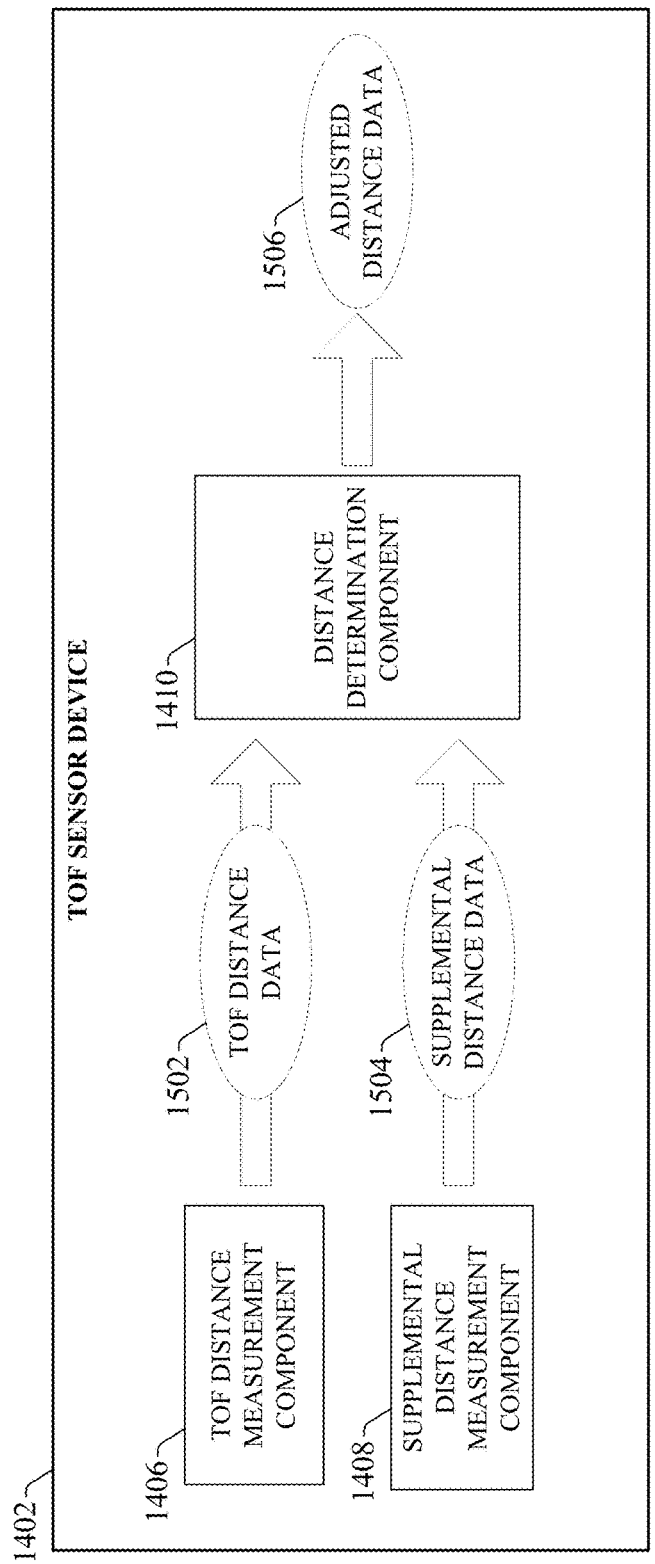
FIG. 15 is a block diagram illustrating correction of distance data correction by leveraging both a TOF distance measurement and another distance measurement obtained using a different principle.

FIG. 15 is a block diagram illustrating general principles of distance data correction by TOF sensor device 1402. TOF distance measurement component 1406 generates TOF distance data 1502 for respective pixels corresponding to an object within a viewing space being monitored by the TOF sensor device 1402. As described in previous examples, the TOF distance measurement component employs either phase shift measurement principles or pulsed TOF measurement principles to determine a distance value for one or more pixels corresponding to the object. These principles determine the TOF distance data 1502 by analyzing the emitted light beam (or pulsed light beam if pulsed TOF principles are used) and the reflected light beam received at the sensor device from the object.

In order to calibrate the sensor device, or to determine an error correction factor to be applied do the TOF distance data 1502, the supplemental distance measurement component 1408 employs a second principle to determine a distance of the object from the TOF sensor device 1402. The second distance measurement principle for a given TOF sensor device 1402 can be selected to suit the particular distance measurement application in which the sensor device is to be used. For example, for applications in which relatively short distances are being measured (e.g., objects are expected to be relatively close to the sensor), an inductive sensor may be used as the supplemental distance measurement component 1408. Inductive sensors operate by establishing an oscillating magnetic field in proximity of a sensing surface of the sensor. When an electrically conductive object is located near the sensing surface in the axis of the magnetic field, the presence of the object modifies the reparation of energy in the magnetic field, which in turn modifies the amplitude of a receive signal induced on a receiver coil in the sensor. Depending on the type of material comprising the object, presence of the object in a proximity of the sensor may cause the current or voltage of the receive signal to either increase or decrease in relation to the distance of the object from the sensor. By monitoring the magnitude of the change in current or voltage, the distance of the object from the sensor can be determined. It is to be appreciated that the present disclosure is not limited to these inductive sensors that operate according to this principle. For example, some inductive sensors may detect presence of an object by analyzing a change in frequency of the receive signal rather than the amplitude.

In another example, triangulation measurement can be used as the second distance measurement principle. This principle may be better suited to for longer distance applications. According to this approach, the sensor emits a beam of light to the viewing space, and a reflected beam from the object is received on a detection surface of the sensor. This creates a triangle between the sensor's light emitter, the object, and the point on the detection surface on which the reflected light beam is incident. Since the angle of the reflected light beam is a function of the distance of the object from the sensor, the sensor is able to determine the distance of the object by measuring the angle of the reflected light beam.

It is to be appreciated that embodiments of the TOF sensor device 1402 are not limited to the inductive sensor and angle measuring sensor principles described above, and that other distance measurement principles can be selected for the supplemental distance measurement component 1408. In general, the supplemental distance measurement component 1408 generates supplemental distance data 1504, which can be leveraged by distance determination component 1410 to correct offset errors in the TOF distance data 1502 to yield adjusted distance data 1506.

Figure 16:
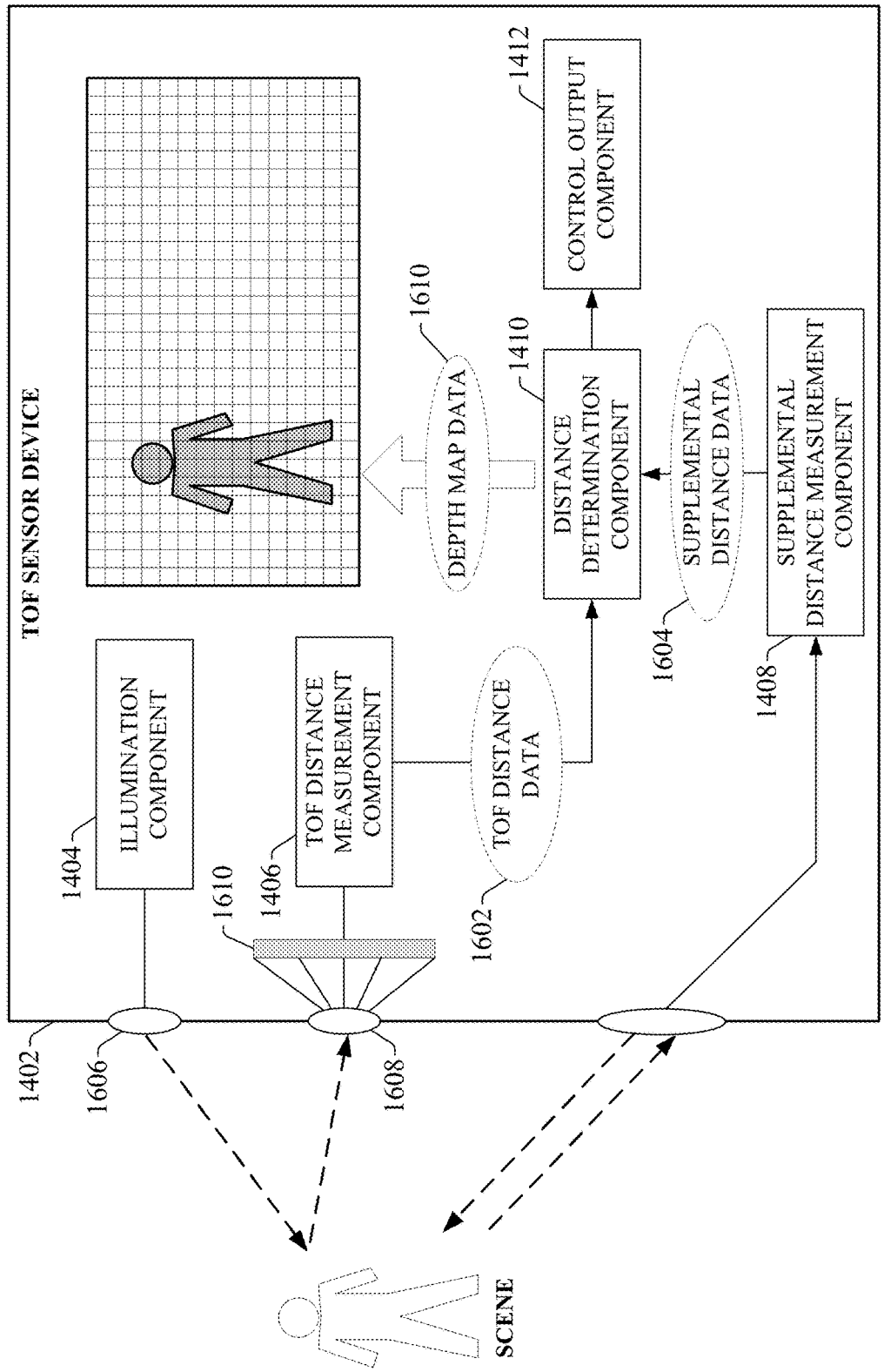
FIG. 16 is a block diagram illustrating operation of a TOF sensor device that leverages both TOF distance measurements and additional distance measurements obtained using a different principle.

FIG. 16 is a block diagram illustrating components of the TOF sensor device 1402 according to one or more embodiments. As described in previous examples, illumination component 1404 emits a beam of light to a scene being monitored by TOF sensor device 1402 via emitting lens component 1606. Light reflected from objects and surfaces within the scene is received at the receiving lens element 1608, which directs the reflected light to photo-receiver array 1610. The photo-receiver array generates electrical outputs for respective pixels of the scene as a function of the intensity of the light incident on the respective pixels. TOF distance measurement component 1406 uses either phase shift measurement or pulsed TOF measurement to generate TOF distance data 1602 for the respective pixels based on analysis of the light received at the receiving lens element 1608 and the emitted light beam.

In order to correct error offsets present in the TOF distance data 1602 or to calibrate distance measurement components, TOF sensor device 1402 also includes supplemental distance measurement component 1408, which is configured to measure object distance information using a second measurement principle. As noted above, this second measurement principle can be chosen to suit the needs of the particular application in which the sensor device is being used. For example, an inductive sensor component may be chosen for applications in which relatively short distances are being measured (e.g., distances within the operational range of the inductive sensor), while an angle measurement sensor may be chosen for applications that measure longer distances. Other suitable distance measurement sensors may also be used. Supplemental distance measurement component 1408 generates supplemental distance data 1604 for the object using the second measurement principle. TOF sensor device 1402 uses supplemental distance data 1604 to perform error correction on the TOF distance data 1602. For example, the TOF distance data 1602 and supplemental distance data 1604 may be provided to distance determination component 1410, which can compare the distance measurements from the two different measurement components and generate a correction factor based on a measured difference between the two values. This correction factor may be a function of the degree of disparity between the TOF distance values and the supplemental distance values, as well as the magnitude of the distance of the object from the sensor, since error offsets may be partially a function of the distance of the object being measured (see equations (1) and (2) above).

In another example, supplemental distance measurement component 1408 may recalibrate the TOF distance measurement component 1406 or the distance determination component 1410 based on a comparison of the supplemental distance data 1604 with the TOF distance data. This recalibration may be performed periodically (e.g., hourly, weekly, etc.) or in response to predefined events (e.g., detection of a new object entering the viewing field, detection of a change in environmental conditions, detecting of a new object having a reflectivity above or below a defined range, etc.). In such embodiments, the supplemental distance measurement component 1408 performs a supplemental distance measurement using the second measurement principle only during these calibration sequences, using a selected object within the viewing space as a reference with which to compare distance values with the TOF distance measurement component 1406.

Since TOF sensor device 1402 employs two diverse distance measurement principles, some embodiments of the TOF sensor device 1402 thereby satisfy the diverse dual channel requirement of some safety integrity standards, making the sensor suitable for use in industrial safety applications.

Figure 17:
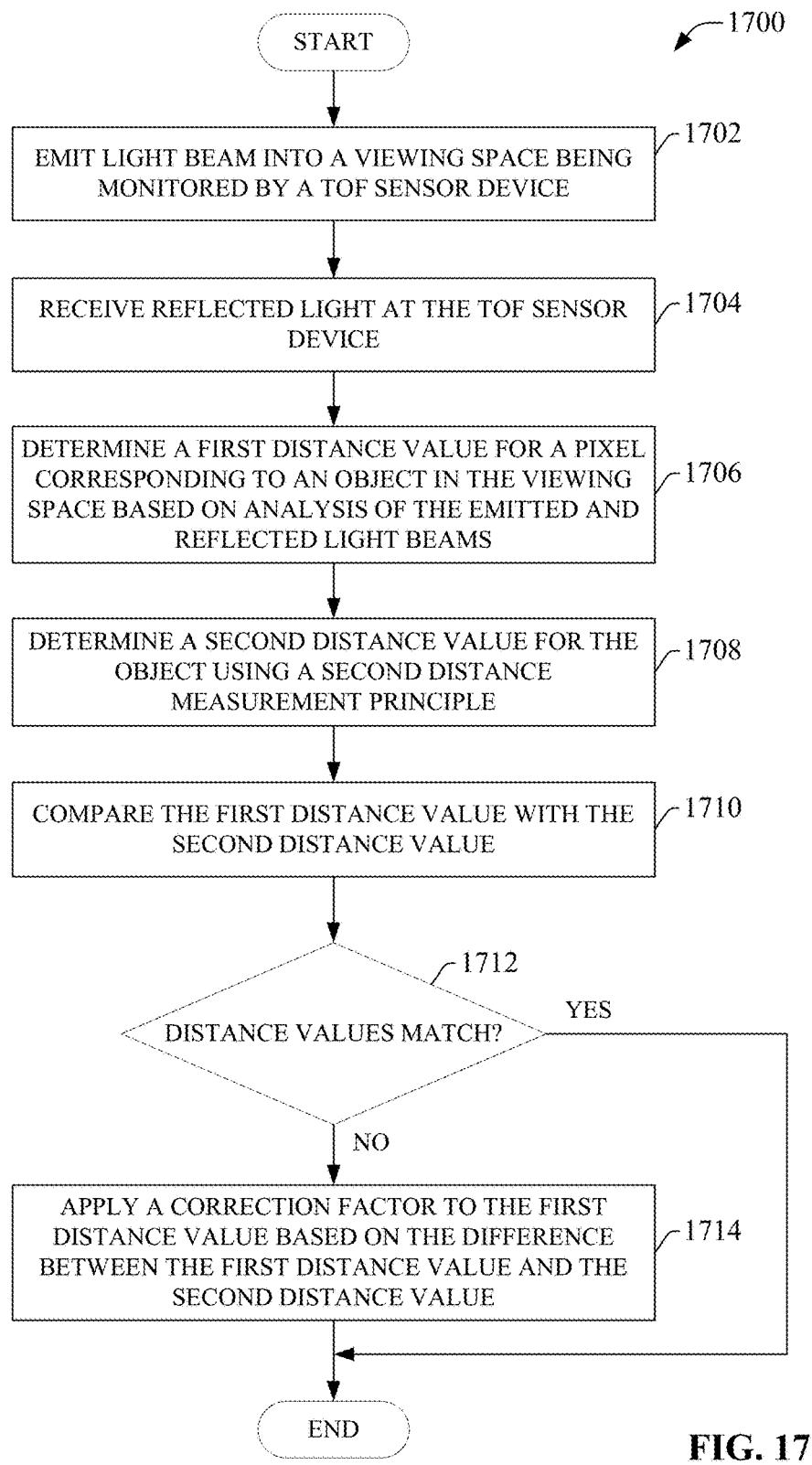
FIG. 17 is a flowchart of an example methodology for determining a distance of an object using a TOF sensor device that employs a second distance measurement principle in addition to TOF distance measurements.

FIG. 17 illustrates an example methodology 1700 for determining a distance of an object (or a point on an object) using a TOF sensor device that employs a second distance measurement principle in addition to TOF distance measurements. Initially, at 1702, a light beam is emitted into a viewing space being monitored by the TOF sensor device. At 1704, reflected light from the object is received at the TOF sensor device. At 1706, a first distance value for a pixel corresponding to an object in the viewing space is determined based on analysis of the emitted and reflected light beams, using either phase shift measurement or pulsed TOF measurement.

At 1708, a second distance value is determined for the pixel of the object using a second distance measurement principle. The second distance measurement principle may comprise, for example, induction sensing or light beam angle measurement. At 1710, the first distance value determined at step 1706 is compared with the second distance value determined at step 1708. At 1712, a determination is made regarding whether the two distance values match (within a defined range of tolerance). If it is determined at step 1712 that the distance values match, the methodology ends and no correction factor is applied. Alternatively, if it is determined at step 1712 that the distance values do not match, the methodology moves to step 1714, where a correction factor is applied to the first distance value based on the difference between the first distance value and the second distance value. The correction factor may additionally be a function of the distance indicated by one or both of the first distance value and the second distance value.

Figure 18:
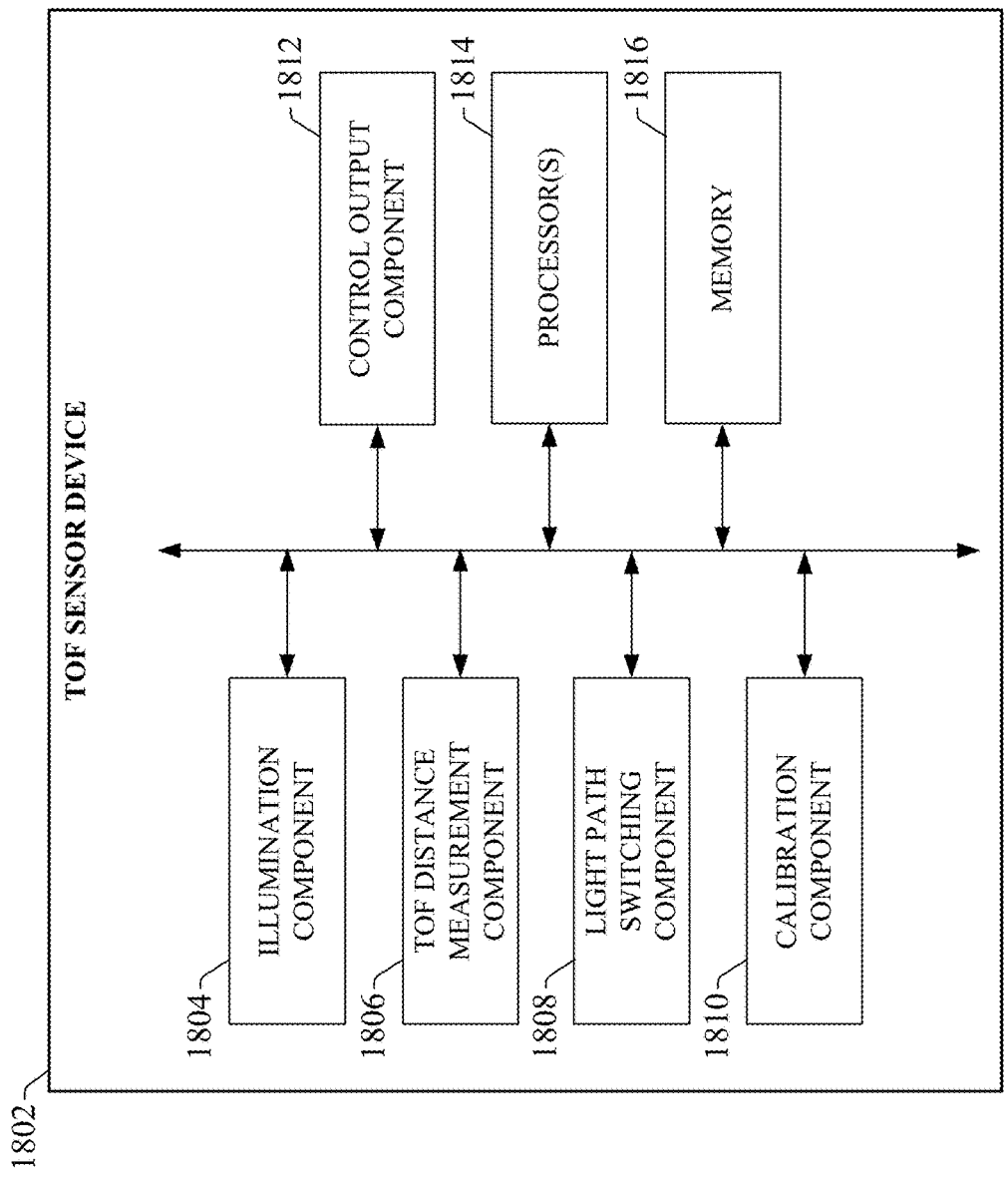
FIG. 18 is a block diagram of an example TOF sensor device that performs distance calibration by redirecting the light path of emitted light to a distance reference structure.
Figure 19:
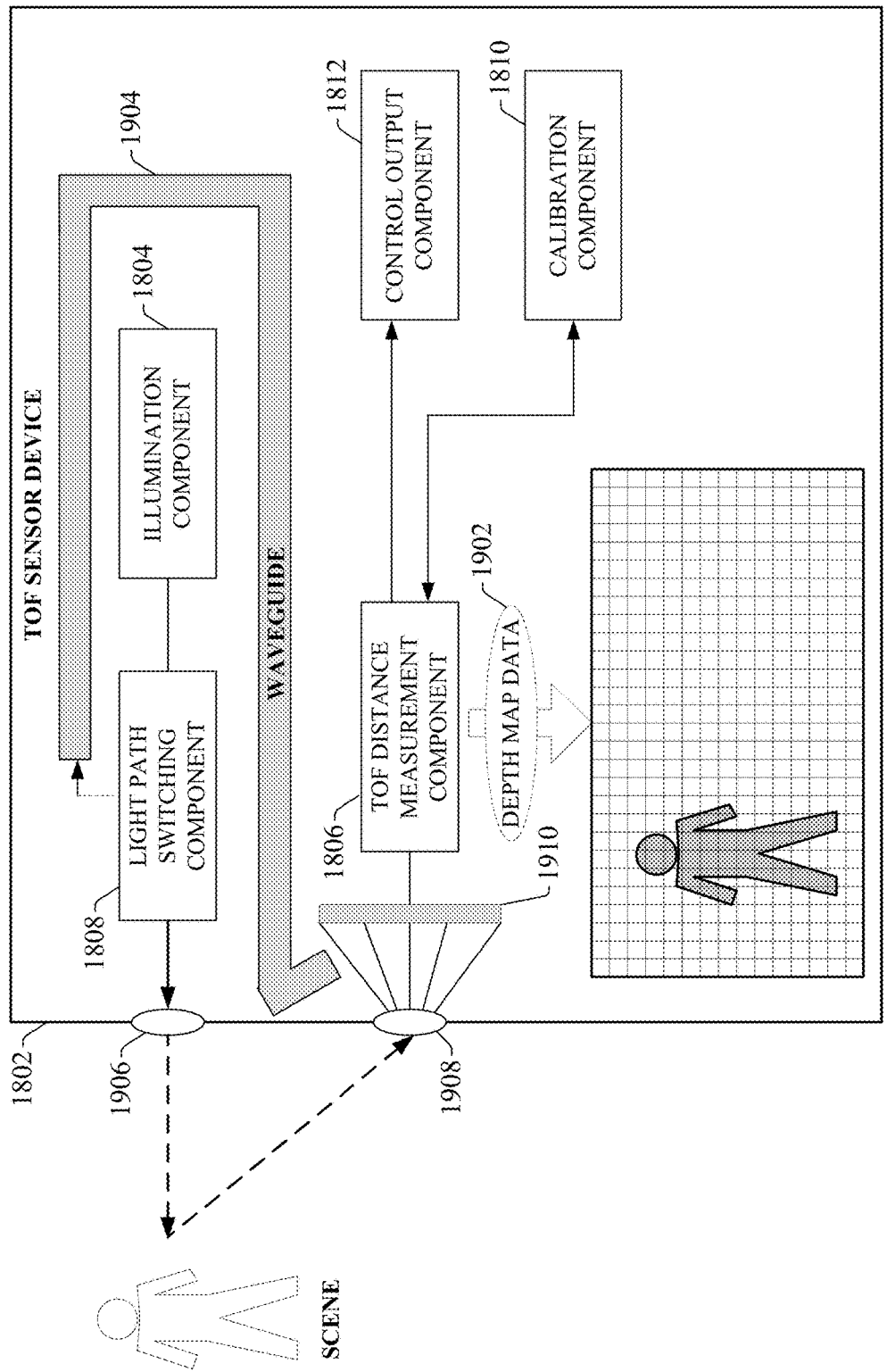
FIG. 19 is a block diagram illustrating normal operation of a TOF sensor device that uses an internal waveguide to perform distance calibrations.
Figure 20:
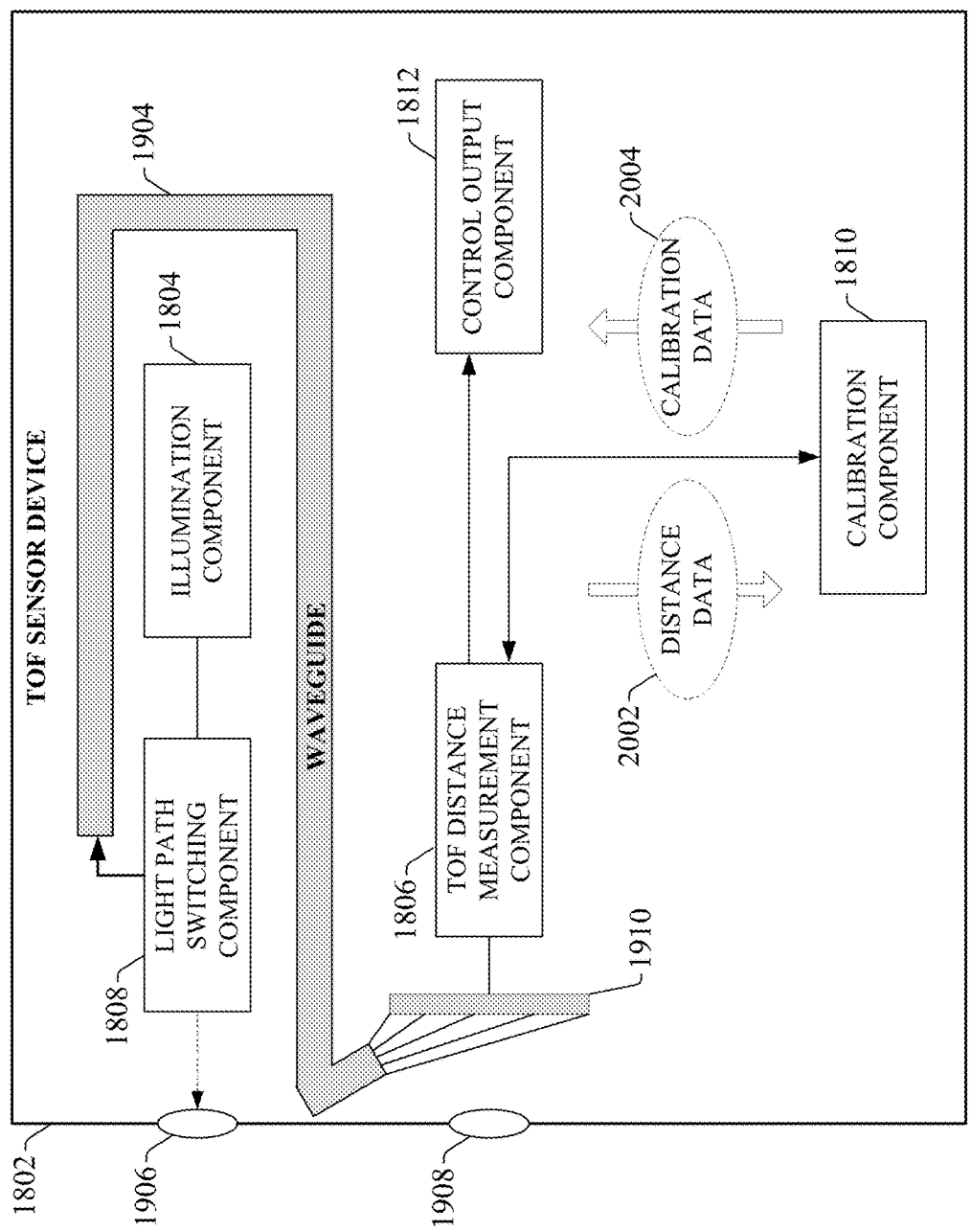
FIG. 20 is a block diagram illustrating a calibration operation of a TOF sensor device that uses an internal waveguide to perform distance calibrations.

FIGS. 18-20 illustrate another approach for determining an absolute distance in a TOF sensor device according to one or more embodiments. According to this approach, the TOF sensor device includes an internal waveguide of a known length (e.g., one meter, ten meters, etc.). In order to test the accuracy of the distance measurement components, the sensor redirects the light generated by the illumination component (e.g., LED, laser, etc.) from the emitting lens element to the waveguide during a calibration sequence. The redirected light traverses the waveguide back to the sensor's photo-receiver array, which calculates the distance traveled using either phase shift measurement or pulsed TOF measurement (depending on the measurement principle used by the sensor). Since the length of the waveguide is known, the system can compare the measured distance with the expected distance to determine whether the measured distance is accurate. If the measured distance deviates from the expected distance, the sensor recalibrates its measurement components based on the measured degree of error offset.

FIG. 18 is a block diagram of an example TOF sensor device according to these embodiments. Although FIG. 18 depicts certain functional components as residing on TOF sensor device 1802, it is to be appreciated that one or more of the functional components illustrated in FIG. 18 may reside on a separate device relative to TOF sensor device 1802 in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

TOF sensor device 1802 can include an illumination component 1804, a TOF distance measurement component 1806, a light path switching component 1808, a calibration component 1810, a control output component 1812, one or more processors 1814, and memory 1816. In various embodiments, one or more of the illumination component 1804, TOF distance measurement component 1806, light path switching component 1808, calibration component 1810, control output component 1812, the one or more processors 1814, and memory 1816 can be electrically and/or communicatively coupled to one another to perform one or more of the functions of the TOF sensor device 1802. In some embodiments, components 1804, 1806, 1808, 1810, and 1812 can comprise software instructions stored on memory 1816 and executed by processor(s) 1818. TOF sensor device 1802 may also interact with other hardware and/or software components not depicted in FIG. 18. For example, processor(s) 1814 may interact with one or more external user interface devices, such as a keyboard, a mouse, a display monitor, a touchscreen, another sensor, a network, a safety device, or other such interface devices.

Illumination component 1804, TOF distance measurement component 1806, and control output component 1812 can be configured to perform similar functions similar to those performed by the illumination components, TOF distance measurement components, and control output components described above in previous examples. Light path switching component 1808 can be configured to selectively direct a light path for light generated by the illumination component 1804 from the emitting lens element (during normal operation) to a waveguide internal to the sensor (during a calibration operation). The calibration component 1810 can be configured to determine whether the TOF distance measurement component 1806 generates an accurate distance value for light transmitted through the internal waveguide, and recalibrate the TOF distance measurement component 1806 if the measured distance is inaccurate.

The one or more processors 1814 can perform one or more of the functions described herein with reference to the systems and/or methods disclosed. Memory 1816 can be a computer-readable storage medium storing computer-executable instructions and/or information for performing the functions described herein with reference to the systems and/or methods disclosed.

FIG. 19 is a block diagram illustrating components of the TOF sensor device 1802 according to one or more embodiments. In particular, FIG. 19 illustrates TOF sensor device 1802 during normal operation of determining distances of objects within a scene being monitored. As in previous examples, illumination component 1804 emits a beam of light (or a pulsed beam if the sensor employs pulsed TOF principles) into the scene via emitting lens element 1906. The illumination component 1804 can use any suitable light source to generate the light, including but not limited to an LED, laser, or remote phosphor. Reflected light from surfaces and objects within the scene is received at the receiving lens element 1908, which directs the received light to photo-receiver array 1910. TOF distance measurement component 1806 generates distance information for respective pixels of the resulting image data based on analysis of the emitted and reflected light, using either phase shift measurement or pulsed TOF measurement. The collective distance information for all pixels yields depth map data 1902 for the scene. Depending on the type of application in which the sensor is being used, control output component 1812 can generate suitable control or feedback outputs based on distance information generated by the TOF distance measurement component 1806.

In this example, the direction of light generated by the illumination component 1804 is controlled by light path switching component 1808. In particular, depending on the state of light path switching component 1808, light generated by the illumination component 1804 will be directed either to the emitting lens element 1906 for emission to the viewing space, or to internal waveguide 1904, which directs the light back to the photo-receiver array via an internal light path of a known distance (e.g., one meter, ten meters, etc.).

When a calibration sequence is initiated, light path switching component 1808 switches the light path from the emitting lens element 1906 to the waveguide 1904, as shown in FIG. 20. The waveguide 1904 directs the light to the photo-receiver array 1910, causing the light to traverse a known distance between the light source and the photo-receivers equal to the length of the waveguide. During this calibration sequence, TOF distance measurement component 1806 calculates a distance value for at least one pixel based on the light received from the waveguide, using the same calculation algorithms as if the light had been received via the receiving lens element 1908 as reflected light from the viewing space. The resulting distance data 2002 is provided to calibration component 1810, which compares the distance data 2002 with the expected distance value (i.e., the length of the waveguide). If the distance data 2002 deviates from the expected distance in excess of a defined window of tolerance, calibration component 1810 generates calibration data 2004 for recalibration of the TOF distance measurement component 1806. The recalibration may comprise, for example, modifying a scale factor used by the TOF distance measurement component 1806 based on the magnitude of the deviation.

The calibration sequence described above can be initiated manually, or may be initiated automatically in response to detected conditions. For example, the TOF sensor device 1802 may be configured to initiate the calibration sequence in response to a determination that an environmental condition (e.g., ambient temperature) has drifted outside a specified window of tolerance for accurate measurement. In another example, the TOF sensor device 1802 may be configured to initiate the calibration sequence each time a new object of interest is detected within the viewing space, to ensure that an accurate distance measurement will be obtained for the object. In yet another example, the sensor may initiate the calibration sequence when an object having a reflectivity that is greater than or less than a defined reflectivity range is detected within the viewing space.

Figure 21:
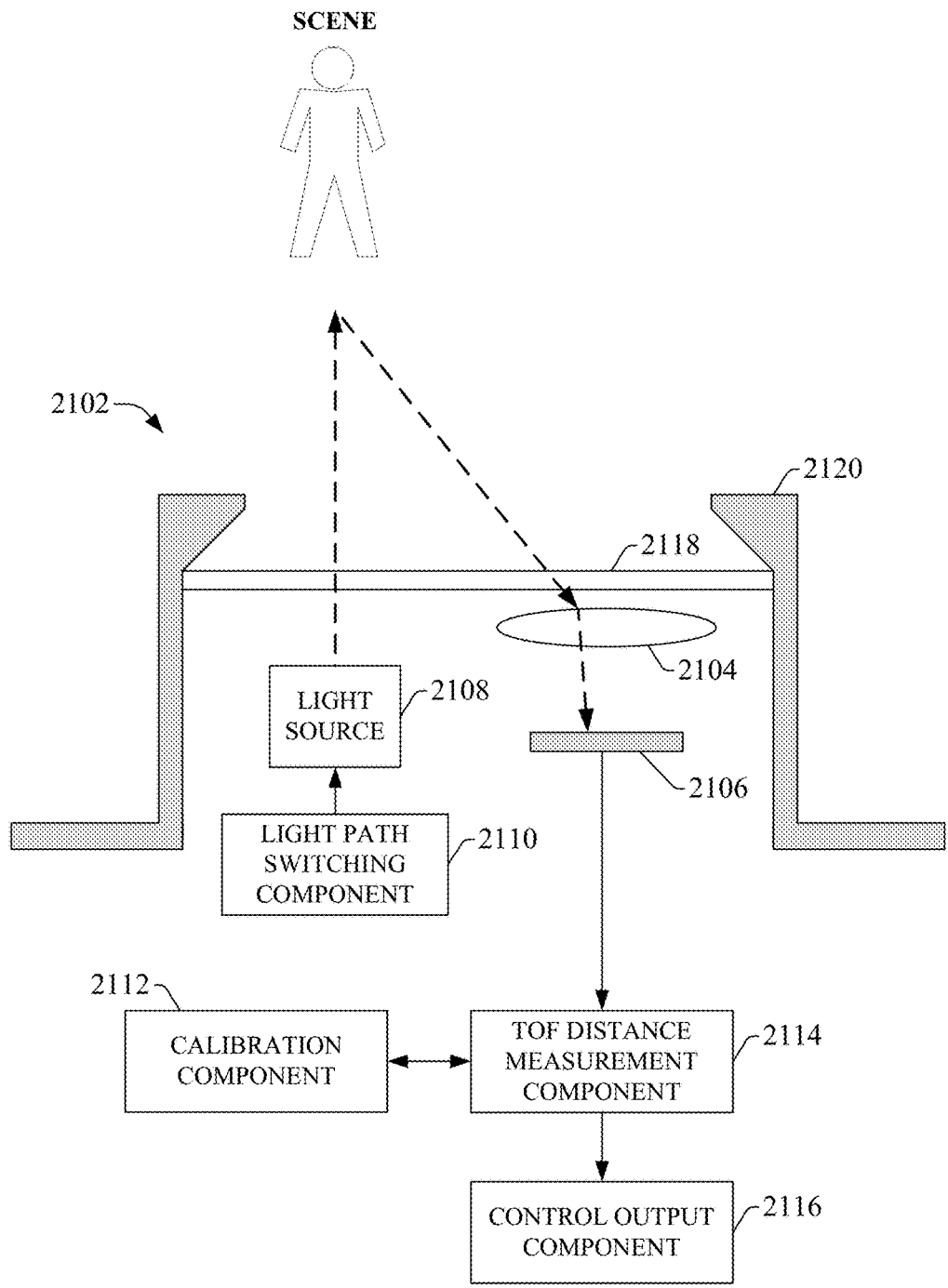
FIG. 21 is a block diagram illustrating normal operation of a TOF sensor device that leverages parasitic reflections to calibrate distance measurements.

In some embodiments, a similar calibration principle can be applied without the use of an internal waveguide by using parasitic reflections from a reference surface on the housing of the sensor itself. FIG. 21 is a block diagram of a TOF sensor device 2102 that leverages parasitic reflections to calibrate distance measurements. In this example, the sensor device 2102 comprises a window 2118 supported by a sensor housing 2120. A light source 2108 (e.g., an LED source, a laser source, etc.) emits a light beam through the window to the scene, and reflected light from objects and surfaces within the scene is returned to the sensor. The reflected light passes through the window 2118, and receiving lens element 2104 directs the received light to photo-receiver array 2106. TOF distance measurement component 2114 generates distance values for respective pixels of the scene, as described in previous examples. Control output 2116 is configured to generate control and/or feedback outputs based in part on this distance information.

Figure 22:
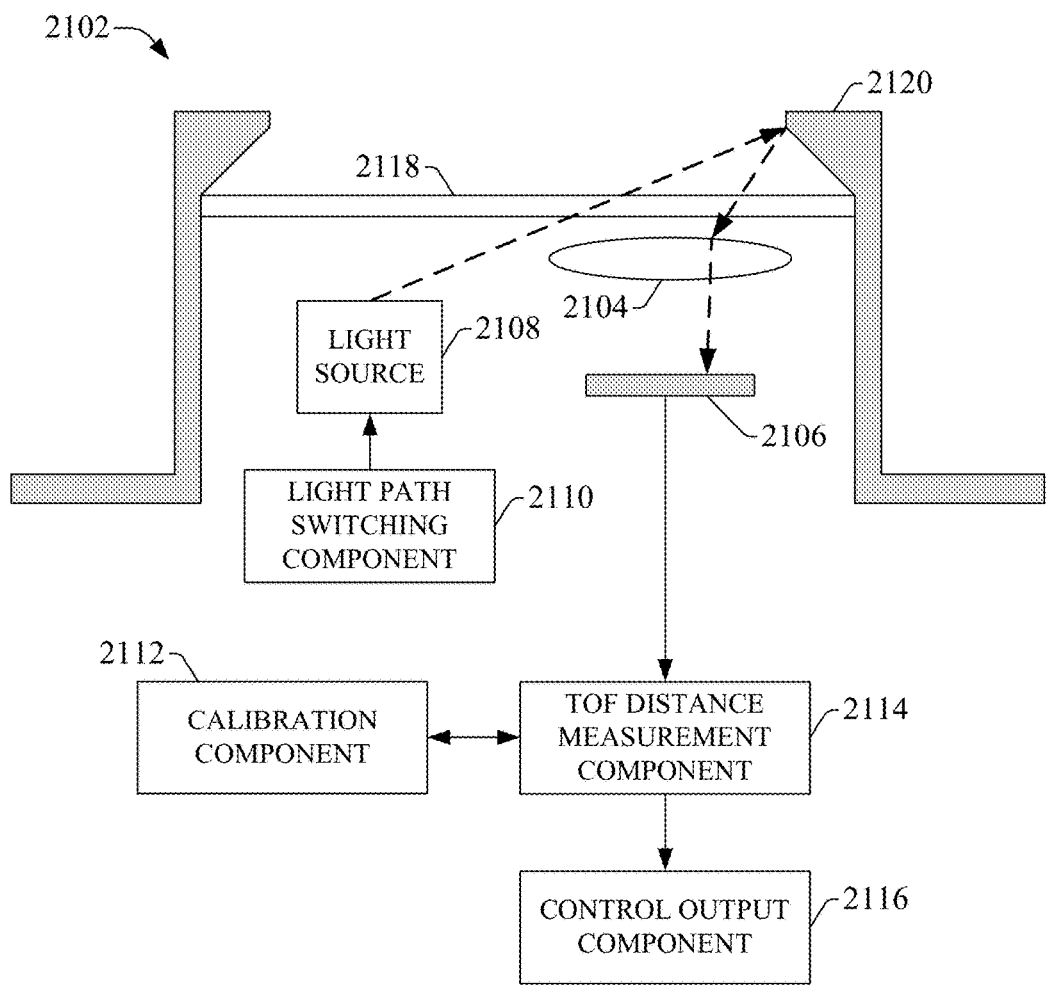
FIG. 22 is a block diagram illustrating a calibration operation of a TOF sensor device that leverages parasitic reflections to calibrate distance measurements.

FIG. 22 is a block diagram illustrating calibration of TOF sensor device 2102. When the calibration sequence is initiated, light path switching component 2110 causes light source 2108 to redirect its beam to a surface of housing 2120 that is a known distance from photo-receiver array 2106. Directing the light to this housing surface causes parasitic reflections to fall back to the receiving lens element 2104, which directs the reflected light to photo-receiver array 2106. Since the distance of the light path from the light source 2108 to the surface of the housing 2120 and from the surface to the photo-receiver array is known, calibration component 2112 can compare the distance measured by TOF distance measurement component 2114 for this reflected light with the expected distance (the known light path distance) to determine whether recalibration is required. In this regard, calibration component 2112 performs similar accuracy verification and recalibration functions to those performed by calibration component 1810 of FIG. 20. However, in this example the known calibration distance is defined by the light path between the light source 2108, housing surface, and photo-receiver array 2106 rather than an internal waveguide.

Figure 23:
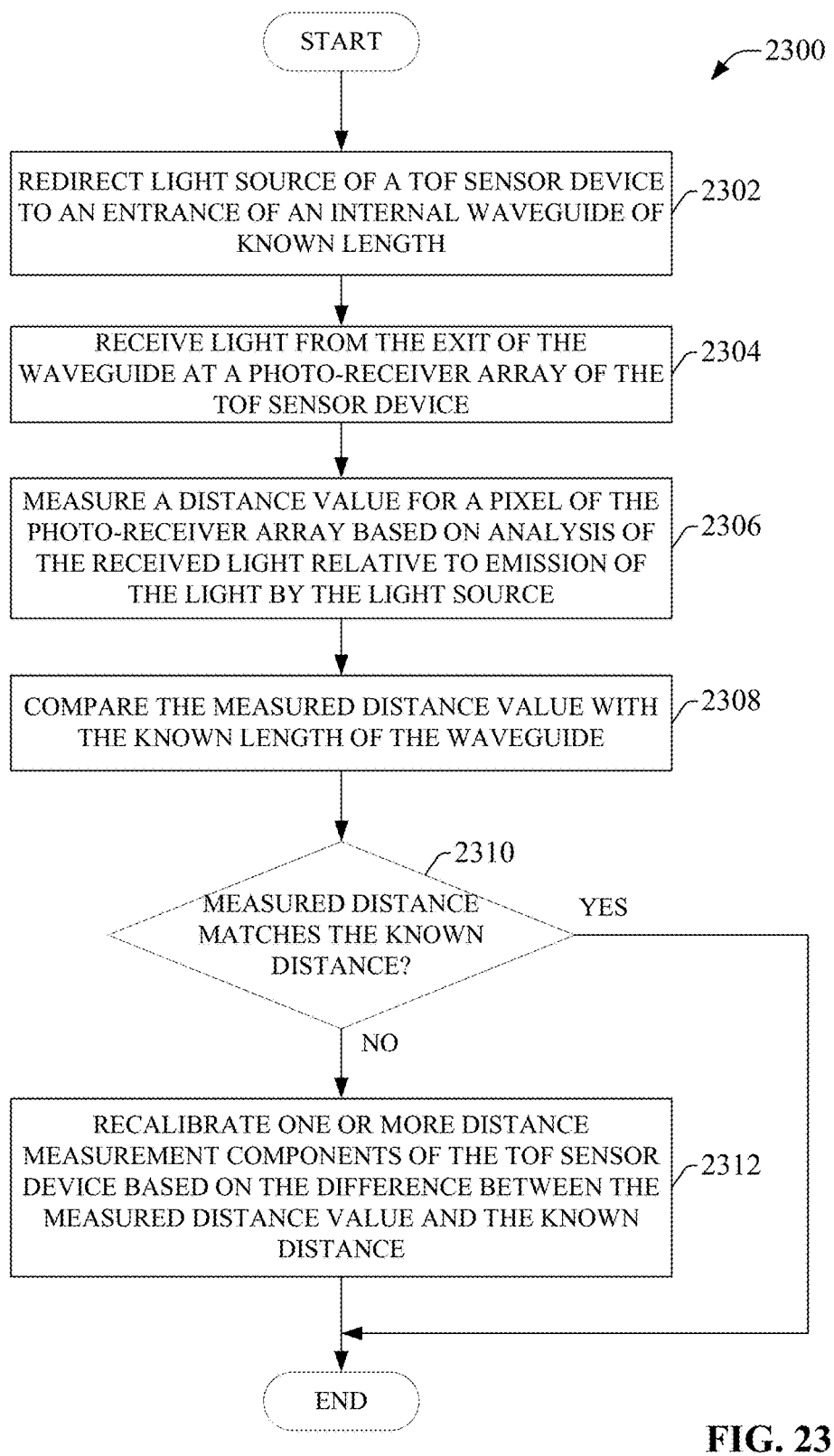
FIG. 23 is a flowchart of an example methodology for calibrating distance measurement components of a TOF sensor device using an internal waveguide.

FIG. 23 illustrates an example methodology 2300 for calibrating distance measurement components of a TOF sensor device using an internal waveguide. Initially, at 2302, light from the sensor device's light source is redirected to an entrance of an internal waveguide having a known length. At 2304, the redirected light is received from the exit of the waveguide at a photo-receiver array of the TOF sensor device. At 2306, a distance value is measured for at least one pixel of the photo-receiver array based on analysis of the received light relative to emission of the light by the light source (e.g., using either phase shift measurement or pulsed TOF measurement principles).

At 2308, the distance measured at step 2306 using the sensor's distance measurement components is compared with the known distance (length) of the waveguide. At 2310, a determination is made regarding whether the measured distance matches the known distance within a defined tolerance range. If the measured distance matches the known distance, the methodology ends and no recalibration is performed. Alternatively, if it is determined at step 2310 that the measured distance does not match the known distance, the methodology moves to step 2312, where one or more distance measurement components of the TOF sensor device is recalibrated based on the difference between the measured distance value and the known distance.

Figure 24:
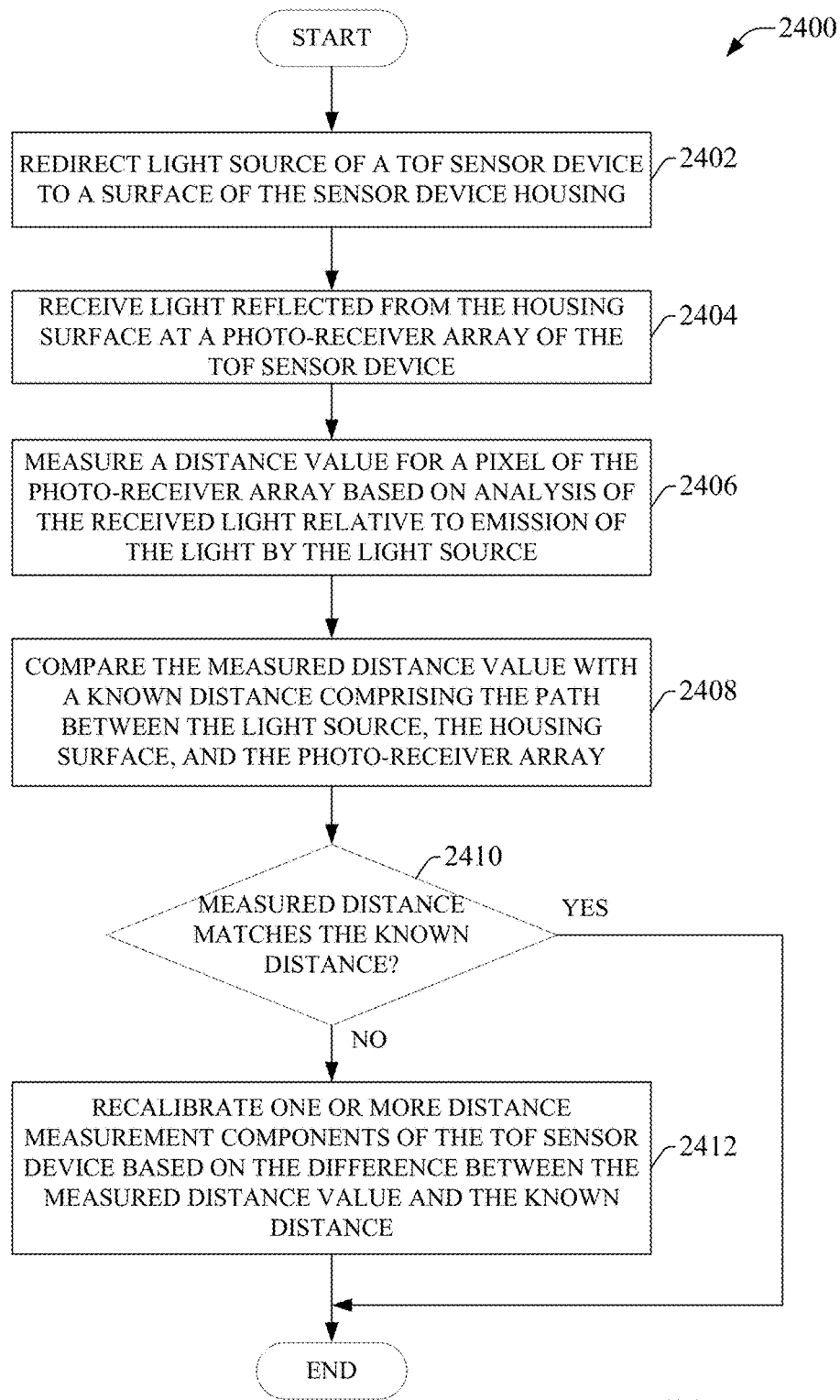
FIG. 24 is a flowchart of an example methodology for calibrating distance measurement components of a TOF sensor device using parasitic reflections.

FIG. 24 illustrates an example methodology 2400 for calibrating distance measurement components of a TOF sensor device using parasitic reflections. Initially, at 2402, light from the sensor device's light source is redirected to a surface of the sensor device's housing. At 2404, reflected light from the housing surface is received at a photo-receiver array of the TOF sensor device. At 2406, a distance value is measured for at least one pixel of the photo-receiver array based on analysis of the received light relative to emission of the light by the light source (e.g., using either phase shift measurement or pulsed TOF measurement principles).

At 2408, the distance measured at step 2406 using the sensor's distance measurement components is compared with a known distance comprising the path between the light source the housing surface, and the photo-receiver array. At 2410, a determination is made regarding whether the measured distance matches the known distance within a defined tolerance range. If the measured distance matches the known distance, the methodology ends and no recalibration is performed. Alternatively, if it is determined at step 2410 that the measured distance does not match the known distance, the methodology moves to step 2412, where one or more distance measurement components of the TOF sensor device is recalibrated based on the difference between the measured distance value and the known distance.

It is to be appreciated that the various distance measurement principles described above—though described individually as being respectively embodied in sensor devices 202, 602, 1002, 1402, 1802, and 2102—can be implemented in any combination within a single sensor device. That is, in addition to the TOF sensor devices described above, any TOF sensor device that includes combined functionality of two or more of sensor devices 202, 602, 1002, 1402, 1802, and 2102 are within the scope of one or more embodiments of this disclosure.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, Ethernet/IP, safety networks (e.g., CIP safety), etc. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 25:
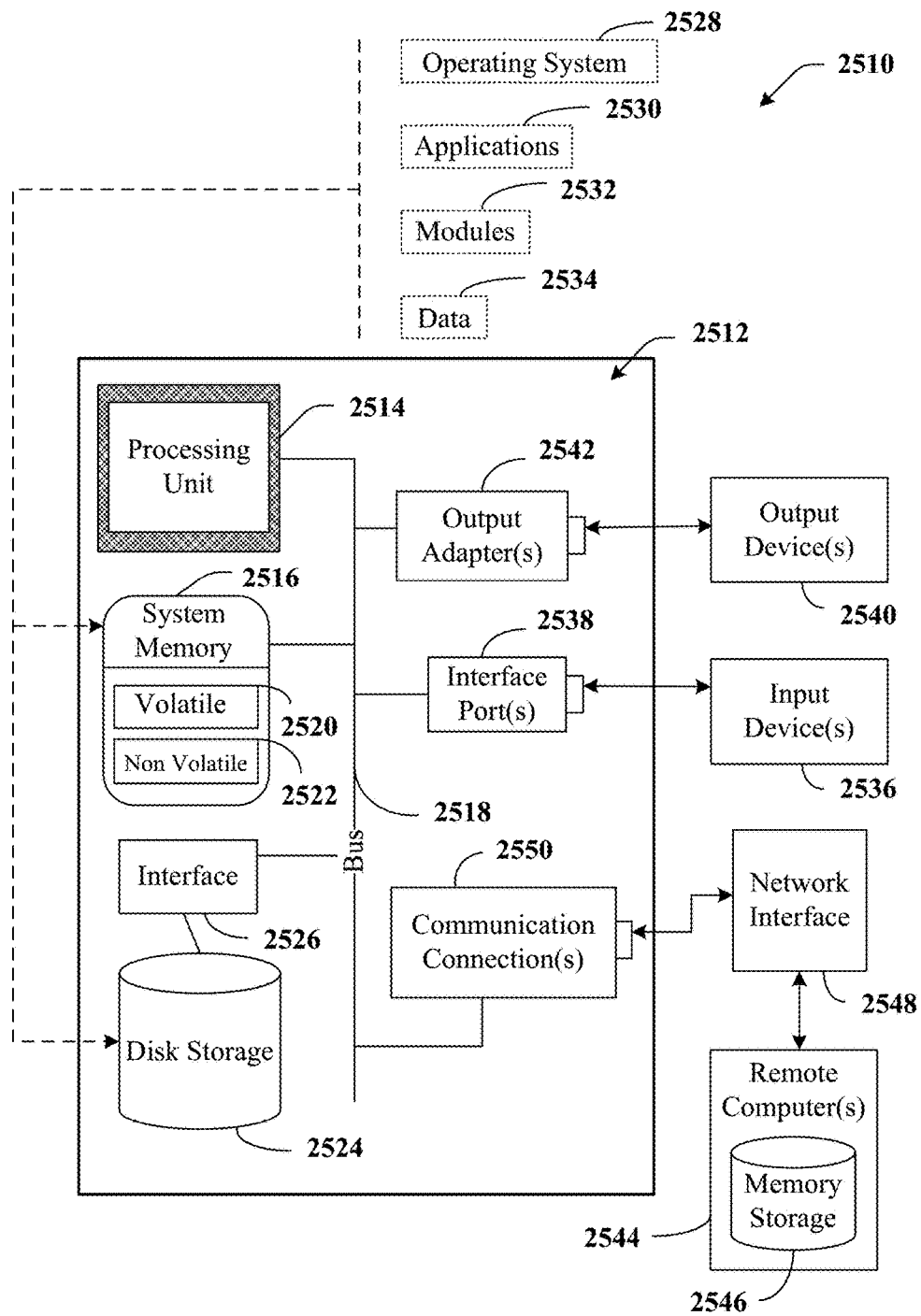
FIG. 25 is an example computing environment.
Figure 26:
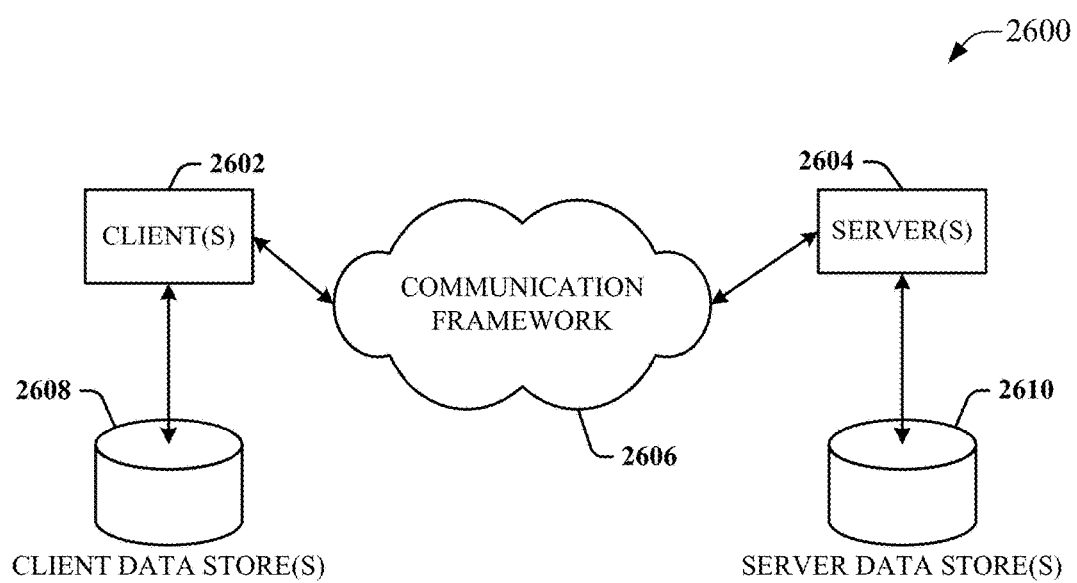
FIG. 26 is an example networking environment.

In order to provide a context for the various aspects of the disclosed subject matter, FIGS. 25 and 26 as well as the following discussion are intended to provide a brief, general description of a suitable environment in which the various aspects of the disclosed subject matter may be implemented.

With reference to FIG. 25, an example environment 2510 for implementing various aspects of the aforementioned subject matter includes a computer 2512. The computer 2512 includes a processing unit 2514, a system memory 2516, and a system bus 2518. The system bus 2518 couples system components including, but not limited to, the system memory 2516 to the processing unit 2514. The processing unit 2514 can be any of various available processors. Multi-core microprocessors and other multiprocessor architectures also can be employed as the processing unit 2514.

The system bus 2518 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2516 includes volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable PROM (EEPROM), or flash memory. Volatile memory 2520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2512 also includes removable/non-removable, volatile/nonvolatile computer storage media. FIG. 25 illustrates, for example a disk storage 2524. Disk storage 2524 includes, but is not limited to, devices like a magnetic disk drive, floppy disk drive, tape drive, Jaz drive, Zip drive, LS-100 drive, flash memory card, or memory stick. In addition, disk storage 2524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2524 to the system bus 2518, a removable or non-removable interface is typically used such as interface 2526.

It is to be appreciated that FIG. 25 describes software that acts as an intermediary between users and the basic computer resources described in suitable operating environment 2510. Such software includes an operating system 2528. Operating system 2528, which can be stored on disk storage 2524, acts to control and allocate resources of the computer 2512. System applications 2530 take advantage of the management of resources by operating system 2528 through program modules 2532 and program data 2534 stored either in system memory 2516 or on disk storage 2524. It is to be appreciated that one or more embodiments of the subject disclosure can be implemented with various operating systems or combinations of operating systems.

A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port may be used to provide input to computer 2512, and to output information from computer 2512 to an output device 2540. Output adapters 2542 are provided to illustrate that there are some output devices 2540 like monitors, speakers, and printers, among other output devices 2540, which require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a personal computer, a server, a router, a network PC, a workstation, a microprocessor based appliance, a peer device or other common network node and the like, and typically includes many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2550 refers to the hardware/software employed to connect the network interface 2548 to the system bus 2518. While communication connection 2550 is shown for illustrative clarity inside computer 2512, it can also be external to computer 2512. The hardware/software necessary for connection to the network interface 2548 includes, for exemplary purposes only, internal and external technologies such as, modems including regular telephone grade modems, cable modems and DSL modems, ISDN adapters, and Ethernet cards.

FIG. 26 is a schematic block diagram of a sample computing environment 2600 with which the disclosed subject matter can interact. The sample computing environment 2600 includes one or more client(s) 2602. The client(s) 2602 can be hardware and/or software (e.g., threads, processes, computing devices). The sample computing environment 2600 also includes one or more server(s) 2604. The server(s) 2604 can also be hardware and/or software (e.g., threads, processes, computing devices). The servers 2604 can house threads to perform transformations by employing one or more embodiments as described herein, for example. One possible communication between a client 2602 and servers 2604 can be in the form of a data packet adapted to be transmitted between two or more computer processes. The sample computing environment 2600 includes a communication framework 2606 that can be employed to facilitate communications between the client(s) 2602 and the server(s) 2604. The client(s) 2602 are operably connected to one or more client data store(s) 2608 that can be employed to store information local to the client(s) 2602. Similarly, the server(s) 2604 are operably connected to one or more server data store(s) 2610 that can be employed to store information local to the servers 2604.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A time-of-flight (TOF) sensor device, comprising:
a memory that stores executable components; and
a processor, operatively coupled to the memory, that executes the executable components, the executable components comprising:
an illumination component configured to emit a light beam toward a viewing space;
a first distance determination component configured to generate first distance information for a pixel corresponding to an object in the viewing space based on a measurement of a phase difference between the light beam and reflected light incident on a photo-receiver array;
a second distance determination component configured to generate second distance information for the pixel based on a measured time duration between emission of a light pulse by the illumination component and receipt of a reflected light pulse at the photo-receiver array; and
a distance adjustment component configured to add a distance value equal or approximately equal to a multiple of a wavelength of the light beam to the first distance information to yield a modified distance value in response to a determination that the second distance information exceeds the first distance information by the multiple of the wavelength.

2. The TOF sensor device of claim 1, further comprising a receiving lens element configured to receive the reflected light and to direct the reflected light to the photo-receiver array,
wherein
the second distance determination component is further configured to generate third distance information based on a focal distance of the receiving lens element as the receiving lens element is focused on the object, and
the distance adjustment component is further configured to apply a correction factor to the first distance information based on the third distance information.

3. The TOF sensor device of claim 1, wherein the second distance determination component comprises an intensity variation measurement component configured to record a variation of an intensity of the reflected light from the object over time to yield intensity variation information.

4. The TOF sensor device of claim 3, wherein the executable components further comprising a distance variation measurement component configured to record a variation of the first distance information for the pixel corresponding to the object over time to yield distance variation information, and
wherein the distance adjustment component is further configured to apply a correction factor to the first distance information in response to a determination that the intensity variation information and the distance variation information do not conform to an inverse-square relationship.

5. The TOF sensor device of claim 1, wherein the second distance determination component comprises at least one of an inductive sensor or a triangulation sensor.

6. The TOF sensor device of claim 1, further comprising a light path switching component configured to redirect light from the illumination component to an entrance of a waveguide internal to the TOF sensor device in response to initiation of a calibration sequence, wherein
the waveguide is configured to guide the light to the photo-receiver array over a distance, and
the executable components further comprise a calibration component configured to calibrate the first distance determination component based on a difference between the distance and a distance value calculated for the light received from the waveguide at the photo-receiver array.

7. The TOF sensor device of claim 1, further comprising a light path switching component configured to redirect light from the illumination component to a section of a housing of the TOF sensor device in response to initiation of a calibration sequence, wherein
redirection of the light to the section of the housing causes the light to be reflected to the photo-receiver array, and
the executable components further comprise a calibration component configured to calibrate the first distance determination component based on a difference between a distance value calculated for the light reflected to the photo-receiver array from the section of the housing and a calibration distance comprising a length of the light path from the illumination component to the photo-receiver array via the section of the housing.

8. The TOF sensor device of claim 1, further comprising a control output component configured to control a sensor output based on a determination of whether the modified distance value satisfies a criterion.

9. The TOF sensor device of claim 8, wherein the sensor output comprises at least one of a control signal directed to an industrial device, an instruction signal configured to initiate a safety action relating to an industrial system, a feedback message directed to a display device, or depth map data.

10. A method for generating distance information, comprising:
emitting, by a time-of-flight (TOF) sensor comprising at least one processor, a light beam into a viewing area;
generating, by the TOF sensor, a first distance value for a pixel corresponding to an object in the viewing area based on a measured phase shift between the light beam emitted by the TOF sensor and reflected light received at a photo-receiver array of the TOF sensor;
generating, by the TOF sensor, a second distance value for the pixel based on a measured time duration between emission of a light pulse by the TOF sensor and receipt of a reflected light pulse from the object at the photo-receiver array;
determining, by the TOF sensor, that the second distance value exceeds the first distance value by a multiple of a wavelength of the light beam; and
adding, by the TOF sensor, a distance value equivalent or approximately equivalent to the multiple of the wavelength to the first distance value in response the determining to yield a corrected distance value.

11. The method of claim 10, further comprising:
generating, by the TOF sensor, a correction factor based on a focal length of a receiving lens element of the TOF sensor as the receiving lens element is focused on the object; and
applying, by the TOF sensor, the correction factor to the first distance value.

12. The method of claim 10, further comprising:
monitoring, by the TOF sensor, a variation of an intensity of the reflected light received at the photo-receiver array over time to yield an intensity variation;
monitoring, by the TOF sensor, the first distance value over time to yield a distance variation;
generating, by the TOF sensor, a correction factor based on a determination that the intensity variation and the distance variation deviate from an inverse-square relationship; and
applying, by the TOF sensor, the correction factor to the first distance value.

13. The method of claim 10, wherein the generating the second distance value comprises generating the second distance value based on at least one of an inductive measurement or a measurement of an angle of the reflected light beam received at the photo-receiver array.

14. The method of claim 10, further comprising:
redirecting, by the TOF sensor, the light beam to an entrance of a waveguide inside the TOF sensor in response to initiation of a calibration sequence;
measuring, by the TOF sensor, a third distance value based on light received at the photo-receiver array from the waveguide; and
calibrating, by the TOF sensor, a measurement component used to generate the first distance value based on a difference between the third distance value and a length of the waveguide.

15. A non-transitory computer-readable medium having stored thereon instructions that, in response to execution, cause a time-of-flight (TOF) sensor device comprising a processor to perform operations, the operations comprising:
sending a light beam into an area being monitored by the TOF sensor device;
determining a first distance value for a pixel corresponding to an object in the area based on a measurement of a phase difference between the light beam and reflected light received at a photo-receiver array of the TOF sensor device;
determining a second distance value for the pixel based on a measured elapsed time between sending of a light pulse by the TOF sensor device and receipt of a reflected light pulse at the photo-receiver array; and
in response to determining that the second distance value is greater than the first distance value by a multiple of a wavelength of the light beam, adding a distance value equal to or approximately equal to the multiple of the wavelength to the first distance value to yield a corrected distance value.

16. The non-transitory computer-readable medium of claim 15, wherein the operations further comprise:
generating a correction factor based on a focal length of a receiving lens element of the TOF sensor device as the receiving lens element is focused on the object; and
modifying the first distance value based on the correction factor.

17. The non-transitory computer-readable medium of claim 15, wherein the operations further comprise:
monitoring a variation of an intensity of the reflected light received at the photo-receiver array over time to yield an intensity variation;
monitoring the first distance value over time to yield a distance variation;
generating a correction factor based on a determination that the intensity variation and the distance variation deviate from an inverse-square relationship; and
modifying the first distance value based on the correction factor.

18. The non-transitory computer-readable medium of claim 15, wherein the operations further comprise:
redirecting the light beam to an entrance of a waveguide inside the TOF sensor device in response to initiation of a calibration sequence;
measuring a third distance value based on light received at the photo-receiver array from the waveguide; and
calibrating a measurement component used to generate the first distance value based on a difference between the third distance value and a specified length of the waveguide.

19. A time-of-flight (TOF) sensor device, comprising:
a memory that stores executable components; and
a processor, operatively coupled to the memory, that executes the executable components, the executable components comprising:
an illumination component configured to emit a light beam toward a viewing space;
a first distance determination component configured to generate first distance information for a pixel corresponding to an object in the viewing space based on time-of-flight analysis of reflected light incident on a photo-receiver array;
a distance variation measurement component configured to record a variation of the first distance information for the pixel over time to yield distance variation information;
an intensity variation measurement component configured to record a variation of an intensity of the reflected light from the object over time to yield intensity variation information; and
a distance adjustment component configured to apply a correction factor to the first distance information in response to a determination that the intensity variation information and the distance variation information do not conform to an inverse-square relationship.

20. The TOF sensor device of claim 19, further comprising a receiving lens element configured to receive the reflected light and to direct the reflected light to the photo-receiver array, wherein
the correction factor is based on a difference between the first distance information and second distance information derived for the pixel, and
the second distance information is derived based on a focal distance of the receiving lens element as the receiving lens element is focused on the object.

* * * * *